US007936877B2

(12) United States Patent
Abe et al.

(10) Patent No.: US 7,936,877 B2
(45) Date of Patent: *May 3, 2011

(54) DATA TRANSFER SYSTEM, DATA TRANSFER DEVICE, DATA RECORDING DEVICE AND DATA TRANSFER METHOD

(75) Inventors: Miki Abe, Kanagawa (JP); Eiichiro Morinaga, Tokyo (JP); Takayasu Kon, Tokyo (JP); Yasunori Kamada, Tokyo (JP)

(73) Assignee: Sony Corporation, Tokyo (JP)

( * ) Notice: Subject to any disclaimer, the term of this patent is extended or adjusted under 35 U.S.C. 154(b) by 139 days.

This patent is subject to a terminal disclaimer.

(21) Appl. No.: 11/585,192

(22) Filed: Oct. 24, 2006

(65) Prior Publication Data

US 2007/0110243 A1 May 17, 2007

Related U.S. Application Data

(63) Continuation of application No. 10/297,955, filed as application No. PCT/JP02/03675 on Apr. 12, 2002, now Pat. No. 7,164,767.

(30) Foreign Application Priority Data

Apr. 13, 2001 (JP) ................................. 2001-115308

(51) Int. Cl.
*H04K 1/00* (2006.01)
(52) U.S. Cl. ........... 380/269; 380/37; 380/200; 380/217
(58) Field of Classification Search .................... 380/37, 380/200, 217, 269
See application file for complete search history.

(56) References Cited

U.S. PATENT DOCUMENTS

| 5,021,891 | A | * | 6/1991 | Lee ................................ 382/250 |
| 5,253,275 | A | * | 10/1993 | Yurt et al. ...................... 375/240 |
| 5,406,558 | A | * | 4/1995 | Rovira et al. .................. 370/326 |
| 5,418,713 | A | * | 5/1995 | Allen ............................... 705/32 |
| 5,448,583 | A | * | 9/1995 | Miyamoto et al. ............ 714/795 |
| 5,452,104 | A | * | 9/1995 | Lee ........................... 358/426.14 |
| 5,636,276 | A | * | 6/1997 | Brugger .......................... 705/54 |
| 5,822,541 | A | * | 10/1998 | Nonomura et al. ........... 709/247 |
| 6,064,739 | A | * | 5/2000 | Davis ............................. 380/200 |
| 6,330,675 | B1 | * | 12/2001 | Wiser et al. ................... 713/189 |

(Continued)

FOREIGN PATENT DOCUMENTS

EP 0 549 108 6/1993

(Continued)

*Primary Examiner* — Kambiz Zand
*Assistant Examiner* — Tongoc Tran
(74) *Attorney, Agent, or Firm* — Finnegan, Henderson, Farabow, Garrett & Dunner, L.L.P.

(57) ABSTRACT

It is an object to provide an efficient transfer of content data. In a case of transferring the content data from a data transfer device on a primary recording medium side to a data recording device to record the content data in a secondary recording medium, a data compression system and a bit rate that are conformable to the data recording device are compared with a data compression system and a bit rate of the content data to be sent, so that a required transfer processing is brought into realization according to a result of the comparison. For instance, when both the data compression systems are equal, and the bit rate of the content data is not more than the bit rate that is conformable to the data recording device, the content data is sent as it is in an encrypted compressed data state.

3 Claims, 18 Drawing Sheets

U.S. PATENT DOCUMENTS

| | | | |
|---|---|---|---|
| 6,708,220 B1 * | 3/2004 | Olin | 709/247 |
| 6,985,589 B2 * | 1/2006 | Morley et al. | 380/269 |
| 7,110,025 B1 * | 9/2006 | Loui et al. | 348/220.1 |
| 7,200,859 B1 * | 4/2007 | Perlman et al. | 725/133 |
| 7,761,465 B1 | 7/2010 | Nonaka et al. | |

FOREIGN PATENT DOCUMENTS

| | | | |
|---|---|---|---|
| EP | 0549108 A1 * | 1/2001 | |
| EP | 1 150 295 | 10/2001 | |
| JP | 05-110988 | 4/1993 | |
| JP | 08-153376 | 6/1996 | |
| JP | 08-273297 | 10/1996 | |
| JP | 2000-207835 | 7/2000 | |
| WO | WO 00/28539 | * | 5/2000 |
| WO | WO 01/22242 A1 | 3/2001 | |
| WO | WO 01/41443 | 6/2001 | |
| WO | WO 01/65342 | 9/2001 | |

* cited by examiner

F I G. 5
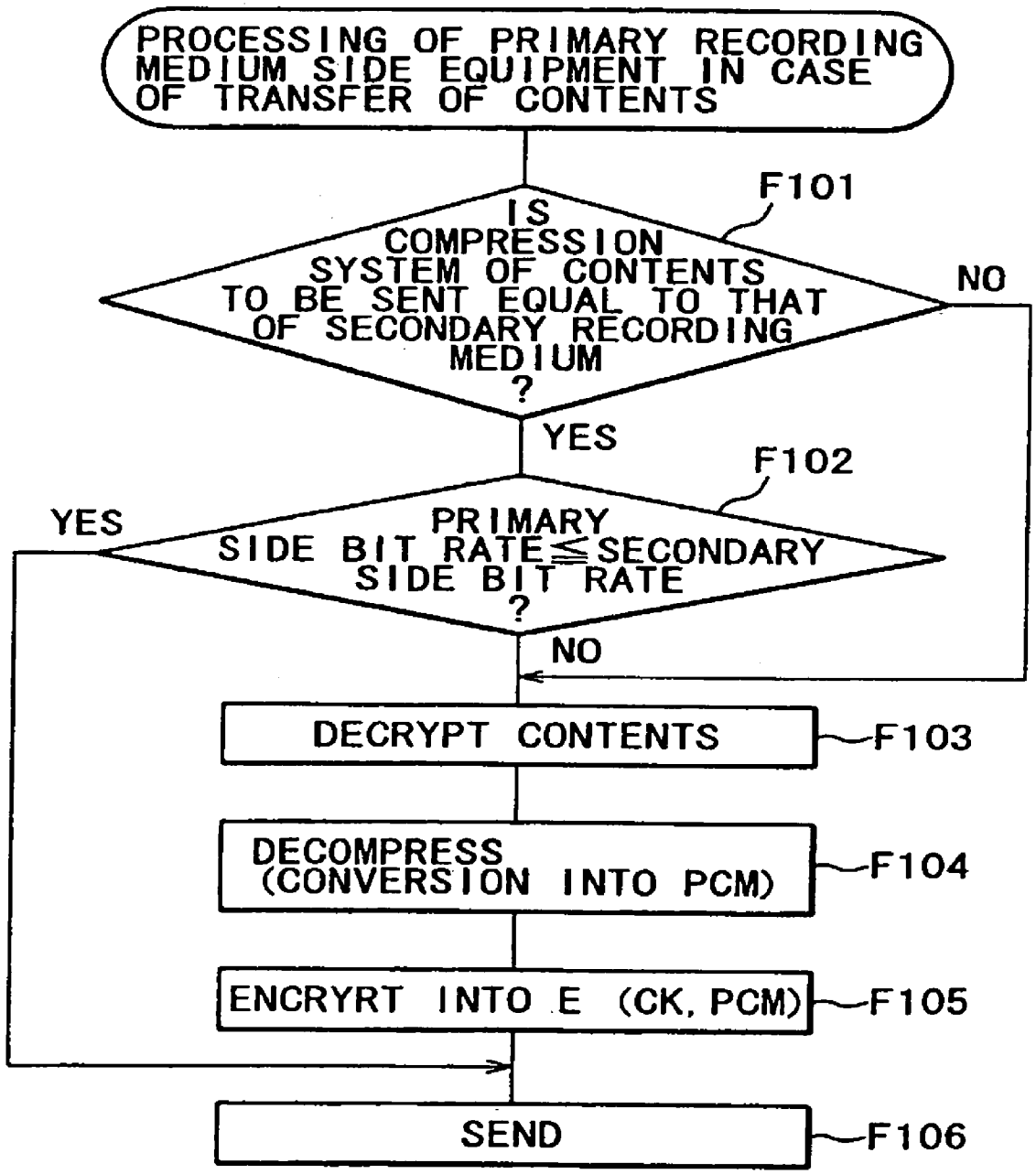

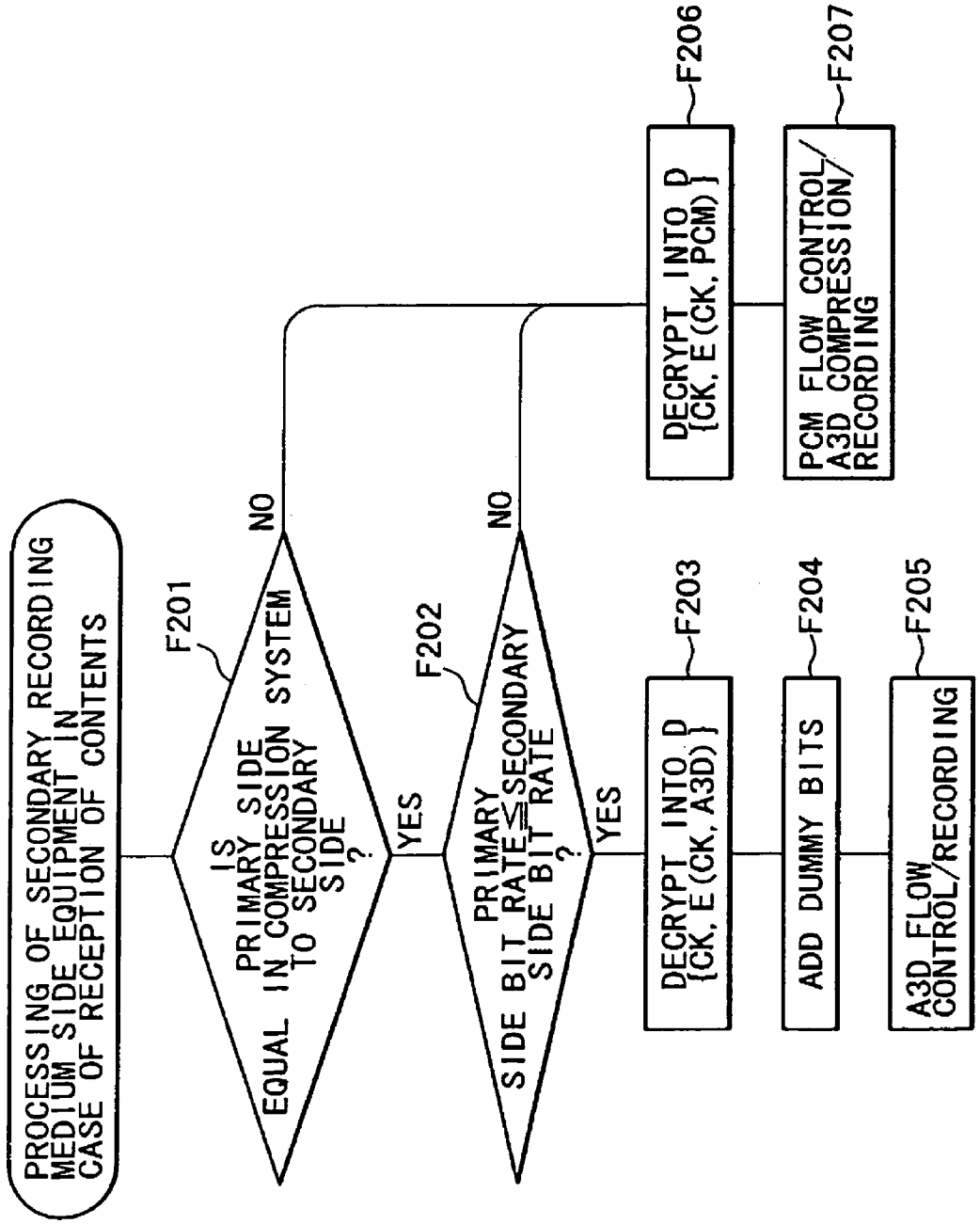

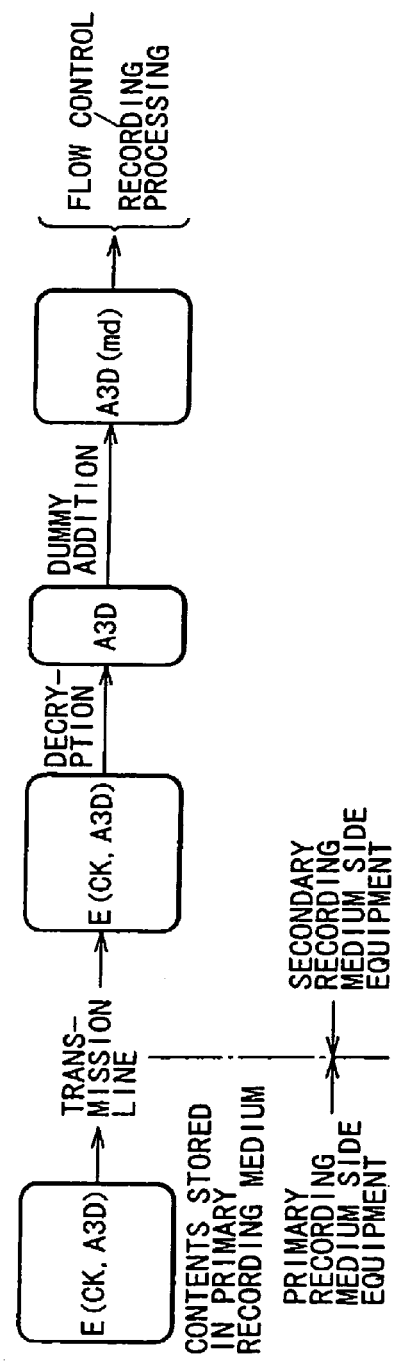
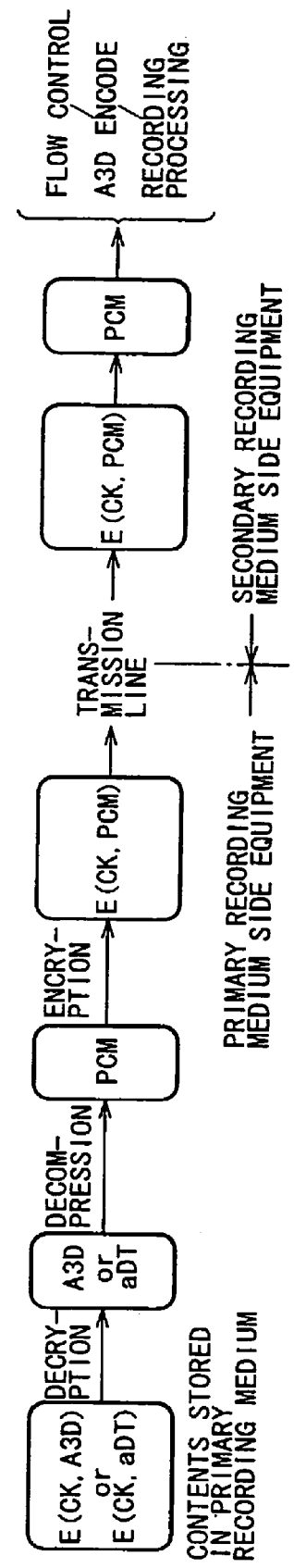

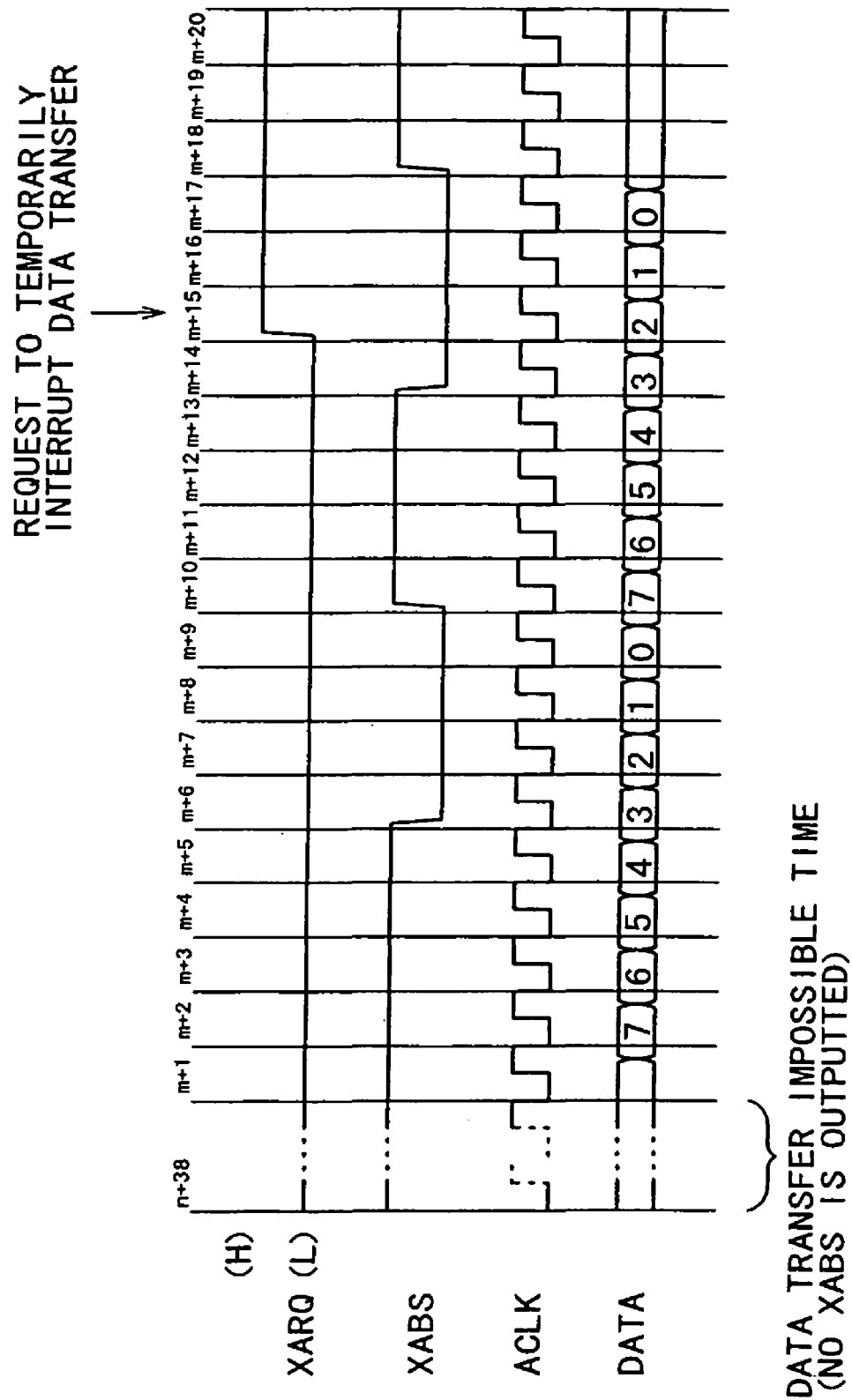

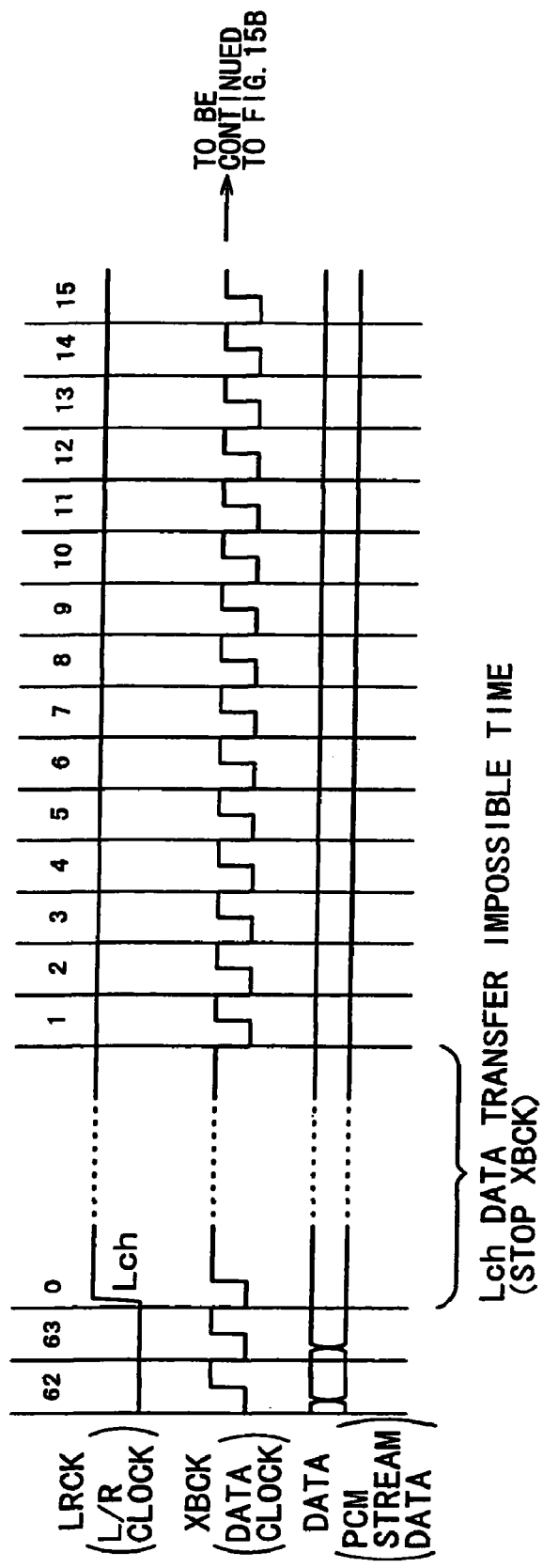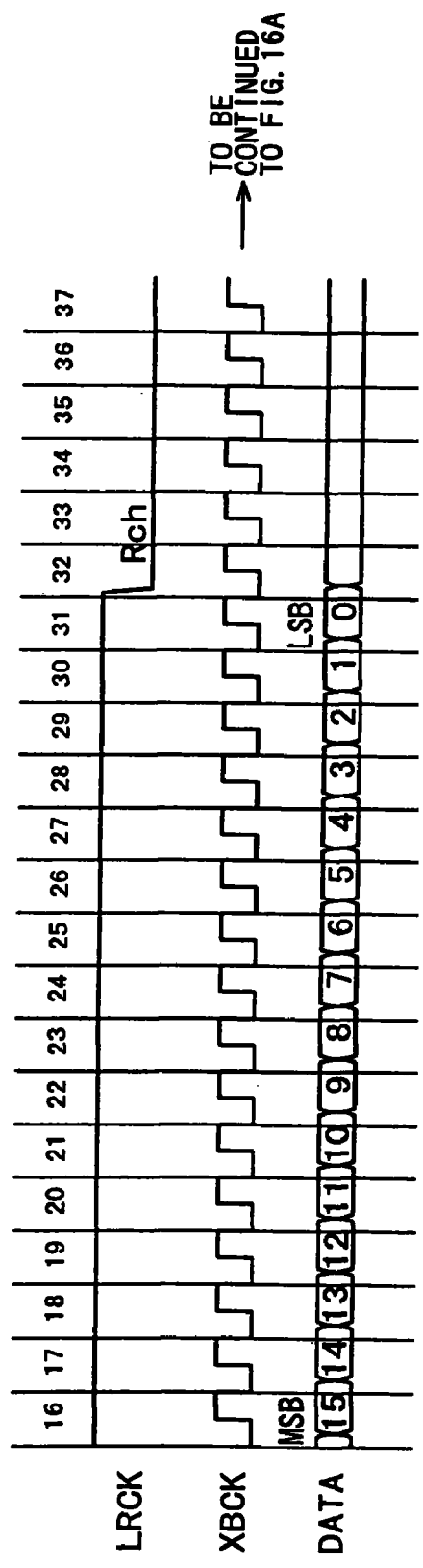

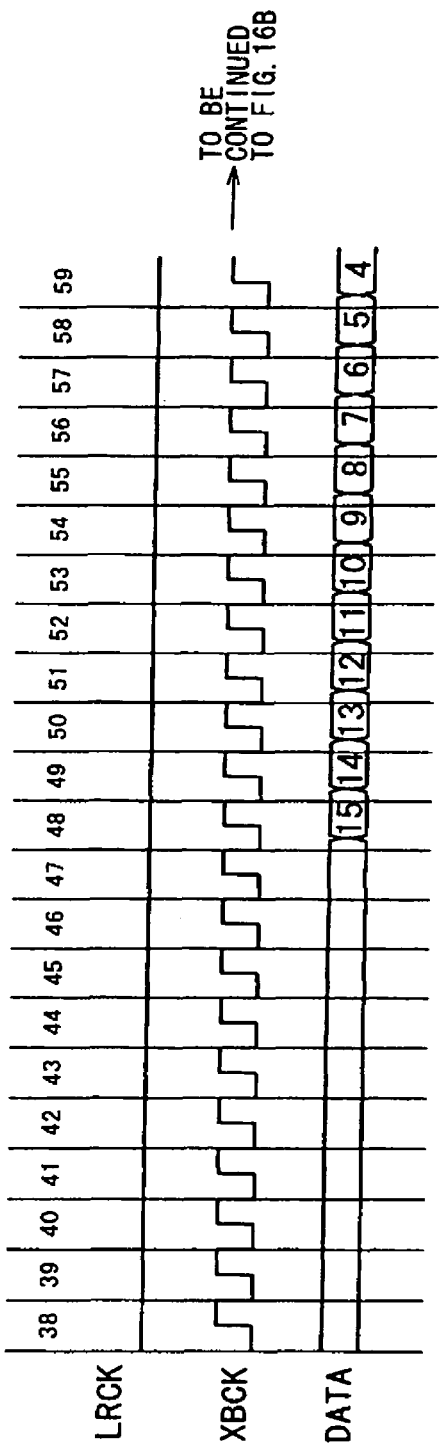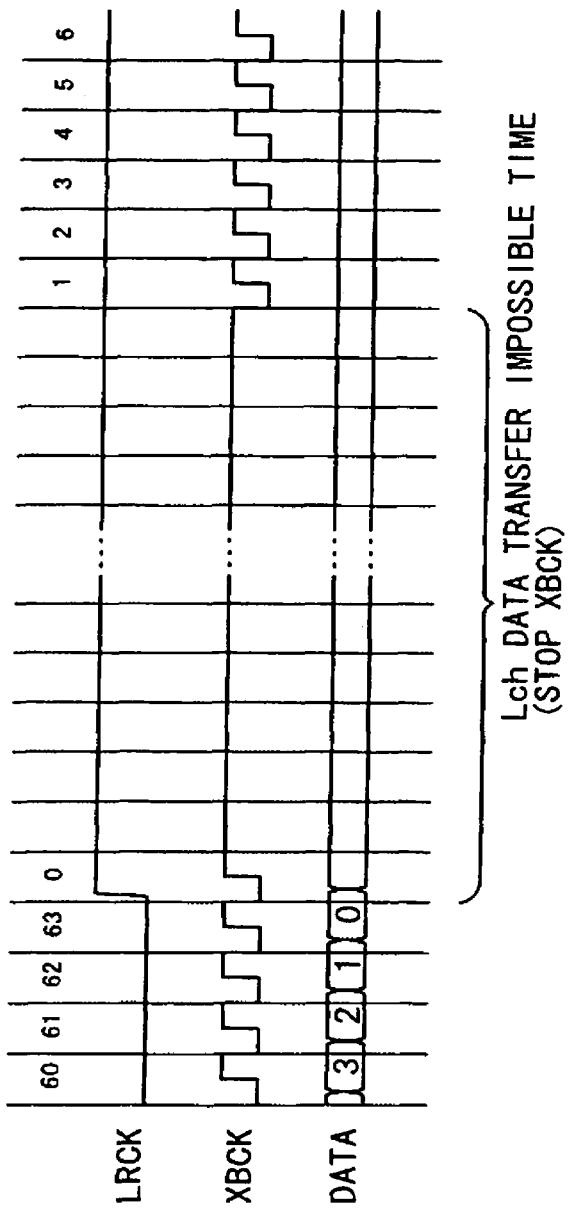

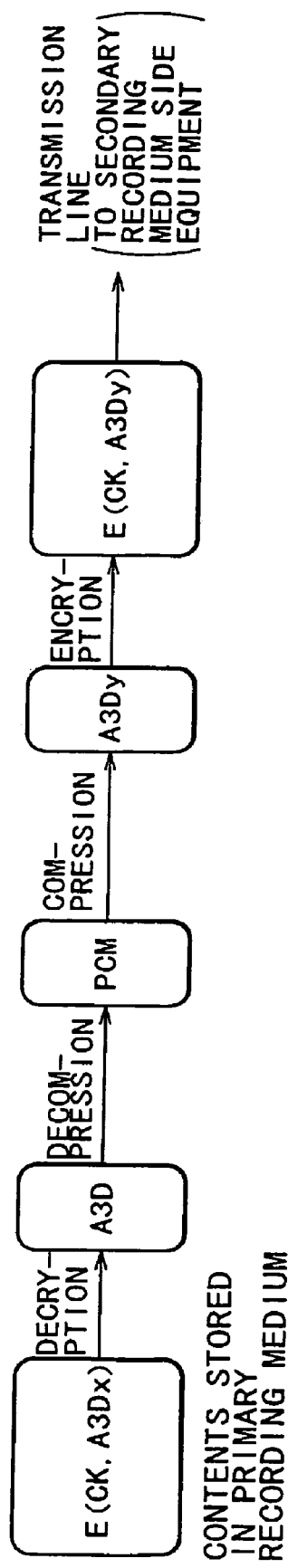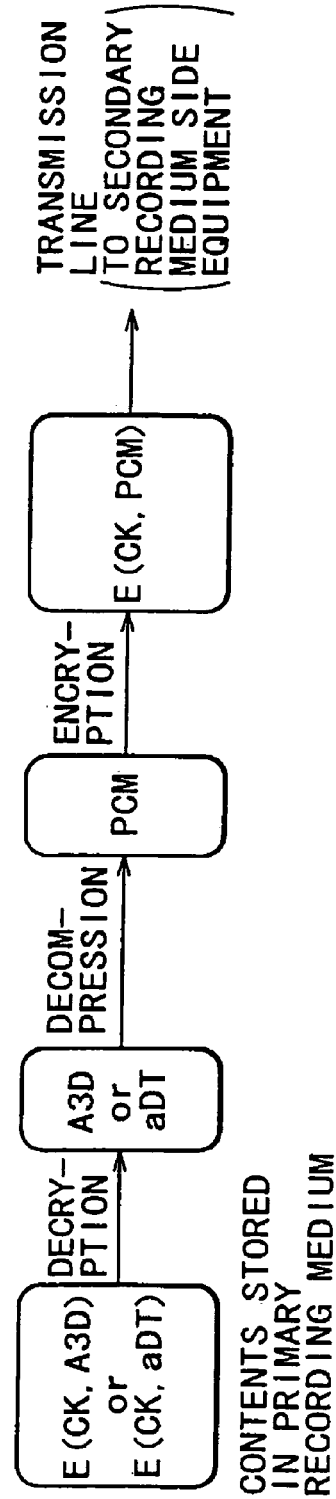

DATA TRANSFER SYSTEM, DATA TRANSFER DEVICE, DATA RECORDING DEVICE AND DATA TRANSFER METHOD

This is a continuation of application Ser. No. 10/297,955, filed May 12, 2003, now U.S. Pat. No. 7,164,767 the disclosure of which is incorporated herein by reference. Application Ser. No. 10/297,955 is a National Phase application of PCT International Application No. PCT/JP02/03675, filed on Apr. 12, 2002, and claims priority to Application No. 2001-115308 filed on Apr. 13, 2001 in Japan.

TECHNICAL FIELD

This invention relates to a data transfer system, a data transfer device, a data recording device and a data transfer method, which are suitable for transfer/recording of content data such as music.

TECHNICAL FIELD

There is a type of usage that a HDD (Hard Disk Drive) of a personal computer, for instance, is treated as a primary recording medium to store content data such as music, while the stored content data is transferred to be recorded in a different recording medium (a secondary recording medium) for enjoying reproducing the music and the like on the secondary recording medium side.

In this case, content data such as music reproduced from package media such as a CD-DA (Compact Disc Digital Audio) and a DVD (Digital Versatile Disc) or content data downloaded from an external music server and the like over a communication network, to which the personal computer is connected, is stored in the HDD. Then, a user connects a recording device of the secondary recording medium to the personal computer to copy (duplicate) or move (transfer) the content data stored in the HDD and reproduces the content data such as music with a reproducing device that is compatible with the secondary recording medium.

As the secondary recording medium, a memory card realized by using a semiconductor memory such as a flash memory, a minidisk serving as a magneto optical disk, a CD-R (CD Recordable), a CD-RW (CD Rewritable), a DVD-RAM, a DVD-R, a DVD-RW and the like, for instance, are supposed to be available.

A recorder/player that is compatible with these media (recording media) widely prevails as a recording device and a reproducing device that are compatible with the secondary recording medium, and is available in various types such as a stationary recording/reproducing device and a portable recording/reproducing device, so that each user puts recording and/or reproduction of the content data into practice according to one's preference and one's own equipment.

Incidentally, in a case of giving a thought to the form of usage of the content data as described above, for instance, copyright protection on the content data must be taken into consideration. If the user makes use of delivering services of the content data or purchases the package media, for instance, to permit the content data to be copied onto the secondary recording medium without any restriction after storage of the content data in the HDD, a situation that a proper protection on right of a copyright holder is not secured occurs. For that reason, there are proposed various techniques as well as arrangements on a data processing such as to make copyright protection maintainable so far as handling of the content data as digital data is concerned, and a standard called SDMI (Secure Digital Music Initiative) is included as one of the proposals.

While a data path established by the SDMI will be described later, it is arranged that after consideration of copyright protection and general user's benefit (a right of copying for private use), transfer/recording to the secondary recording medium should be properly performed on contents stored in the personal computer having the HDD as the primary recording medium, for instance, such as content data (which will be hereinafter referred to as network contents) delivered from an external server over a network, for instance, and content data (which will be hereinafter referred to as disk contents) read out from the package media, such as the CD-DA and the DVD, to be reproduced in a disk-drive device, such as a CD-ROM drive, integrated in the personal computer or a disk drive device connected to the personal computer, for instance.

Incidentally, in a case of transferring the content data to copy from the primary recording medium such as the HDD to the secondary recording medium such as the minidisk, there arise problems as follows.

It is assumed that ATRAC 3 (or other compression system) compressed content data stays encrypted in the HDD serving as the primary recording medium.

Normally, in a case of the network contents equivalent to SDMI-compliant contents, data thereof is originally ATRAC 3 or other compression system encoded data, for instance, which is delivered after being encrypted with a content key CK by a key encryption such as a DES, for instance. Thus, the above-mentioned content data is assumed to be stored in the HDD.

In addition, on the assumption that the minidisk is arranged as the secondary recording medium, a case is considered where a personal computer having the HDD is connected to a minidisk recording device through a USB and the like to transfer the content data stored in the HDD to the minidisk recording device for copying and recording the content data in the minidisk.

The minidisk has been originally developed as a medium for recording ATRAC 3 compressed data, and, in recent devices, is conformable also to the ATRAC 3 system that has been realized by a development of the ATRAC system.

Generally, various bit rate data formats as shown in FIG. 18 are available for the ATRAC 3 system, and there may be also a case where the ATRAC 3 compressed content data to be stored in the HDD uses any format (any bit rate) shown in FIG. 18, for instance.

However, all that is conformable (reproducible) to the minidisk recording/reproducing device is two formats enclosed by broken lines among the formats shown in FIG. 18, that is, only with a bit rate of 132 or 66 kbps.

In addition, the content data to be delivered and stored in the HDD may be also supposed to be compressed data other than the ATRAC 3 compressed data, as a matter of course.

Under these circumstances, a processing as shown in FIGS. 17A and 17B, for instance, is required in a case of transferring the content data to copy and record them from the HDD as the primary recording medium to the minidisk as the secondary recording medium.

It is assumed that the content data stored in the HDD is ATRAC 3 compressed data, and besides, a bit rate thereof is a bit rate that is unconformable to the minidisk recording device. That is, the bit rate is supposed to be any of 176, 146, 105, 94, 47 and 33 kbps.

Incidentally, the ATRAC 3 compressed data is expressed as "A3D" for the convenience of a description. In addition, ATRAC 3 compressed data with a bit rate that is unconformable to the minidisk recording device is expressed as "A3Dx", while ATRAC 3 compressed data with a bit rate that is conformable to the minidisk recording device is expressed as "A3Dy".

Also, data "y" encrypted with a key "x" is expressed as "E (x, y)" for the convenience of a description in the present specification.

In addition, data resulting from decrypting the encrypted data "E (x, y)" with the key "x" is expressed as "D {x, E (x, y)}".

Thus, if the ATRAC 3 compressed data is assumed to be "A3D" as described above, for instance, the contents equivalent to "A3D" encrypted with the key CK will be expressed as "E (CK, A3D)".

In addition, data resulting from decrypting "E (CK, A3D)" with the key CK will be expressed as "D {CK, E (CK, A3D)}".

FIG. 17A shows a processing in a case of converting a compression system into a compression system that is conformable to the minidisk recording device in advance of transmission of the contents on the side of the personal computer having the HDD (the primary recording medium).

In FIG. 17A, when the contents stored in the HDD (the primary recording medium) are supposed to be "E (CK, A3Dx)" resulting from encrypting "A3Dx", which is the ATRAC 3 compressed data with the bit rate that is unconformable to the minidisk recording device, with the key CK, a decryption of "E (CK, A3Dx)" is firstly performed. That is, suppose "D {CK, E (CK, A3Dx)}=A3Dx".

Then, the decrypted data as "A3Dx" is decoded (decompressed) for decompression into non-compressed data, that is, linear PCM data, for instance.

Subsequently, ATRAC 3 compression with the bit rate that is conformable to the minidisk recording device is performed on the PCM data, which is then converted into the compressed data "A3Dy".

Then, the above compressed data is encrypted again with the key CK into encrypted data "E (CK, A3Dy)".

The contents are thus sent in this state to the transmission line such as the USB for supplying to the minidisk recording device.

FIG. 17B shows a processing in a case of converting the compressed content data into non-compressed data in advance of transmission on the side of the personal computer having the HDD (the primary recording medium).

In FIG. 17B, when the contents stored in the HDD are supposed to be "E (CK, A3D)" resulting from encrypting "A3D", which is the ATRAC 3 compressed data, with the key CK, or "E (CK, aDT)" resulting from encrypting "aDT", which is the compressed data other than the ATRAC 3 compressed data, with the key CK, a decryption of the content data is firstly performed. That is, suppose "D {CK, E (CK, A3D)}"=A3D, or "D {CK, E (CK, aDT)}"=aDT.

Then, the decrypted data as "A3D" or "aDT" is decoded (decompressed) for decompression into non-compressed data, that is, linear PCM data, for instance.

Subsequently, the PCM data is encrypted again with the key CK into encrypted data "E (CK, PCM)".

The contents are thus sent in this state to the transmission line such as the USB for supplying to the minidisk recording device.

As long as the processing as shown in FIG. 17A, for instance, is performed in advance of sending the content data, the data itself may be supplied as data in a format that is conformable to the minidisk recording device, even if there is a difference in bit rate and compression system between the content data stored in the HDD and the data reproducible with the minidisk. In addition, in a case of deciding on adopting the processing shown in FIG. 17B, a compression processing will be entrusted to the minidisk recording device, so that the content data is recorded in the minidisk after being converted into the compressed data that is conformable to the minidisk recording device, as a matter of course.

However, in a case of making transmission in the PCM data format as shown in FIG. 17B, the PCM data is the non-compressed data, and hence, is subject to restriction of a transfer rate depending on a bandwidth of the transmission line and an input bandwidth of the secondary recording medium. In particular, the minidisk recording device needs to input the content data in synchronization with a sampling frequency, so that a real time (a time equal to that taken for reproduction of music and the like) is required for a transfer from the primary recording medium to the secondary recording medium.

In this connection, in order to reduce a time taken for the transfer, transmission in the compressed data format over the transmission line as shown in FIG. 17A is conceived to be possible, while a process to convert the compression system and the bit rate of the content data into those of the minidisk recording device side as described above is required to realize the above transmission. For that reason, the equipment (the personal computer) on the primary recording medium side needs to support various kinds of compression systems because of a need for the process as shown in FIG. 17A depending on various kinds of equipment supposed to be connected, so that a burden on a device is heavy. Also, since it is necessary to recompress data as the PCM data once in the process, a processing time cannot be ignored. Further, the PCM data is subject to restriction of the transfer rate depending on a recording rate of the secondary recording medium side equipment (the minidisk recording device and the like).

In addition, when a reference is made to a case where the minidisk recording device is used as the secondary recording medium side equipment, the pertinent data fails to be recorded in the minidisk as it is, even if a conversion of the bit rate as shown in FIG. 17A has been put into practice. This is because the ATRAC 3 compressed data to be handled in the minidisk recording device takes a data format that is arranged in consideration of the ATRAC compressed data.

Further, the processing such as decompression and recompression also brings about a problem that a deterioration of a sound quality occurs.

DISCLOSURE OF THE INVENTION

In view of the above circumstances, it is an object to provide a transfer of content data from a primary recording medium to a secondary recording medium efficiently at high rate according to the present invention.

For that reason, according to the present invention, there are provided a data transfer device, a data recording device and a data transfer system comprising the data transfer device and the data recording device, as well as a data transfer method for use in the data transfer system.

The data transfer device according to the present invention comprises primary recording medium drive means for performing recording and/or reproduction of data to a primary recording medium, storage control means for controlling the content data so as to be stored in an encrypted compressed data state in the primary recording medium, transmission means for sending data to a data recording device that is connected to be capable of sending data, and transmission control means for, in a case of sending the content data stored in the primary recording medium to the data recording device through the transmission means, comparing a data compression system and a bit rate that are conformable to the data recording device with a data compression system and a bit rate of the content data to be sent, and then allowing the content data to be sent as it is in the encrypted compressed data state in a case of a first comparison result, while allowing the content data to be sent as a state of encrypted non-compressed data in a case of a second comparison result.

The first comparison result as used herein is considered to be a comparison result that the data compression system of the content data to be sent is equal to the data compression system that is conformable to the data recording device, and that the bit rate of the content data to be sent is not more than the bit rate that is conformable to the data recording device.

In addition, the second comparison result is considered to be a comparison result that the data compression system of the content data to be sent is different from the data compression system that is conformable to the data recording device, or that the bit rate of the content data to be sent is higher than the bit rate that is conformable to the data recording device.

The data recording device according to the present invention comprises reception means for receiving data sent from the connected data transfer device, secondary recording medium drive means for recording data in a secondary recording medium, decrypting means for converting encrypted content data having been transferred from the data transfer device into a non-encrypted state, and recording control means for allowing the secondary recording medium drive means to record compressed data already converted into the non-encrypted state by the decrypting means in the secondary recording medium after performing a required data addition processing on the compressed data in a case of the content data having been received in the encrypted compressed data state from the data transfer device, while allowing the secondary recording medium drive means to record non-compressed data already converted into the non-encrypted state by the decrypting means in the secondary recording medium after performing a compression processing on the non-compressed data in a case of the content data having been received in an encrypted non-compressed data state from the data transfer device.

In addition, the recording control means controls a transfer state according to a reception processing state in the reception means and a signal processing state of the secondary recording medium drive means, in a case of transferring stream data as the compressed data or the non-compressed data already converted into the non-encrypted state by the decrypting means toward the secondary recording medium drive means for a processing of recording the stream data in the secondary recording medium.

Also, according to the present invention, the data transfer system is built with the above-mentioned data transfer device and the above-mentioned data recording device.

As a data transfer method in a case of transferring content data from a data transfer device with the content data stored in an encrypted compressed data state in a primary recording medium to a data recording device to record the content data in a secondary recording medium, the data transfer method according to the present invention comprises the steps of comparing a data compression system and a bit rate that are conformable to the data recording device with a data compression system and a bit rate of the content data to be sent from the data transfer device, sending the content data as it is in an encrypted compressed data state, and then recording the compressed data in the secondary recording medium after performing a required data addition processing on the compressed data upon completion of a conversion into a non-encrypted state in the data recording device, when the data compression system of the content data to be sent is equal to the data compression system that is conformable to the data recording device and the bit rate of the content data to be sent is not more than the bit rate that is conformable to the data recording device, while sending the content data as a state of encrypted non-compressed data, and then recording non-compressed data in the secondary recording medium after performing a compression processing on the non-compressed data upon completion of a conversion into the non-encrypted state in the data recording device, when the data compression system of the content data to be sent is different from the data compression system that is conformable to the data recording device and the bit rate of the content data to be sent is higher than the bit rate that is conformable to the data recording device.

According to the present invention having the above configuration, an optimum data transfer is realized depending on a relation between the compression system and the bit rate of the stored content data on the primary recording medium side and the compression system and the bit rate on the secondary recording medium side. In addition, the required data addition processing performed on the data recording device side makes the data conformable to a data format that is treated on the secondary recording medium side.

BRIEF DESCRIPTION OF THE DRAWINGS

FIG. 5 is a flow chart showing a processing of primary recording medium side equipment in a case of transfer of contents according to the embodiment;

FIG. 6 is a flow chart showing a processing of secondary recording medium side equipment in a case of transfer of contents according to the embodiment;

FIGS. 7A and 7B illustrate a process of a signal processing in a case of transfer of contents according to the embodiment;

FIG. 14 illustrates a compressed data transfer operation of the secondary recording medium side equipment according to the embodiment;

FIGS. 15A and 15B illustrate a non-compressed data transfer operation of the secondary recording medium side equipment according to the embodiment;

FIGS. 16A and 16B illustrate a non-compressed data transfer operation of the secondary recording medium side equipment according to the embodiment;

FIGS. 17A and 17B illustrate a signal processing in a case of a transfer of contents.

BEST MODE FOR EMBODYING THE INVENTION

Figure 1:
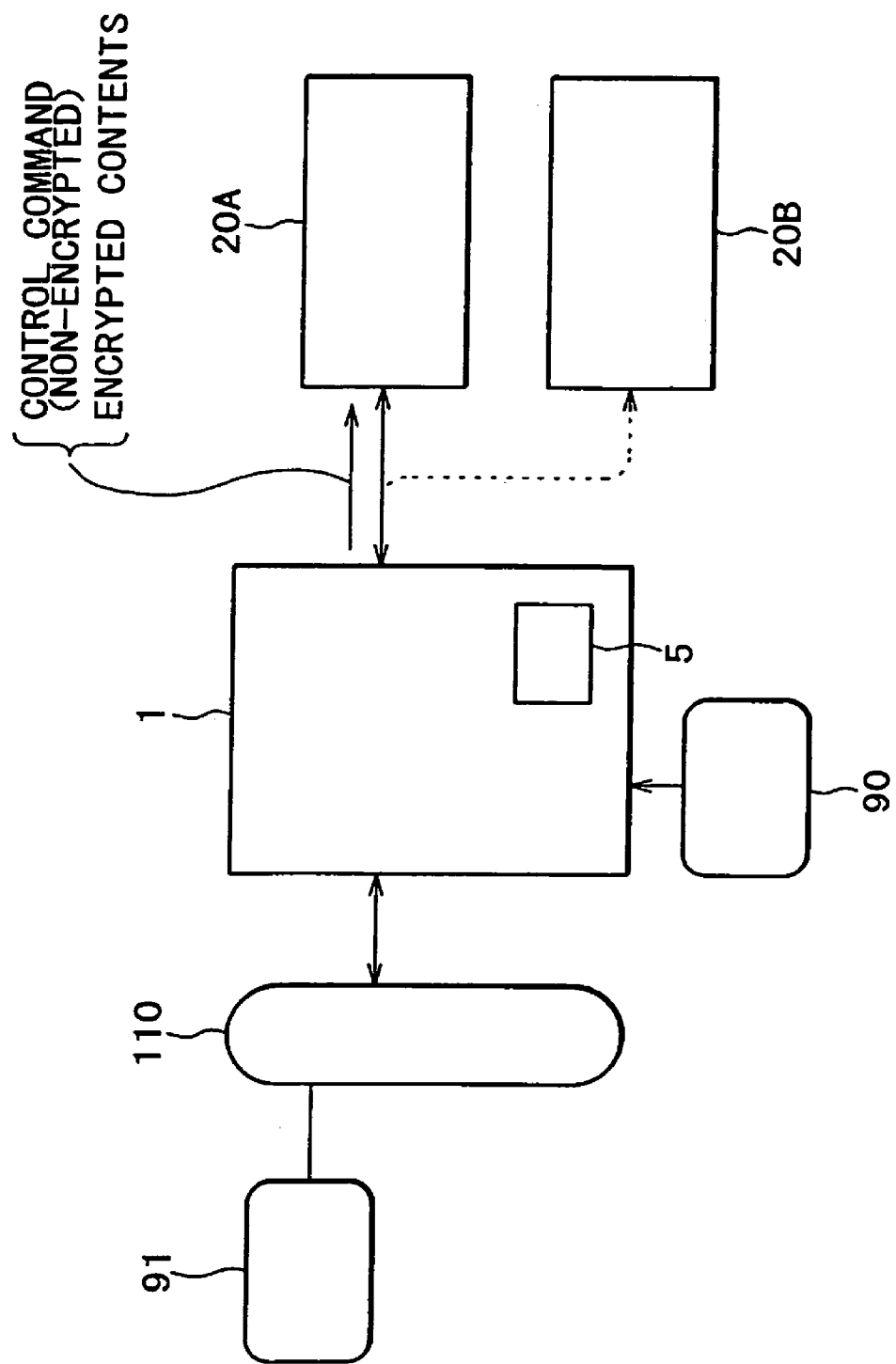
FIG. 1 is a block diagram showing a system configuration according to an embodiment of the present invention.

An embodiment of the present invention will be hereinafter described in the following order.
1. System configuration
2. Data path of SDMI contents
3. Embodiment of configuration of data transfer device (Primary recording medium side equipment/PC)
4. Embodiment of configuration of data recording device (Secondary recording medium side equipment/Recording/reproducing device)
5. Processing in a case of transfer of contents
6. Flow control of data recording device
1. System Configuration FIG. 1 shows a system configuration. Primary recording medium side equipment 1 is equivalent to a data transfer device of the present invention, and secondary recording medium side equipment 20A is equivalent to a data recording device of the present invention. Thus, a configuration including the primary recording medium side equipment 1 and the secondary recording medium side equipment 20A in the system configuration shown in FIG. 1 is equivalent to a data transfer system of the present invention.

The primary recording medium side equipment 1 comprises a personal computer, for instance.

The primary recording medium side equipment 1 will be hereinafter also referred to as the personal computer 1 in some cases, for the convenience of a description. However, it is to be understood that the primary recording medium side equipment 1 is not always made up of the personal computer.

The primary recording medium side equipment 1 conducts an operation required as an operation of the data transfer device as mentioned herein with software that is activated on the personal computer for running a storage/a transfer and the like of SDMI content data, for instance.

Then, an HDD 5 integrated into (or externally mounted to) the personal computer 1 is arranged as a primary recording medium (and primary recording medium drive means). Incidentally, although use of the HDD 5 as the primary recording medium is described in the embodiment, it is a matter of course that recording media equivalent to the primary recording medium are not limited to the HDD, and various kinds of media such as an optical disk, a magneto optical disk, a semiconductor memory integrated into the equipment, a portable semiconductor memory (such as a memory card) and the like, for instance, are supposed to be available.

The primary recording medium side equipment 1 is arranged to permit communication with a content server 91 over a communication network 110, and thereby enables to download content data such as music. It is to be understood that the content server 91 is available in plural numbers as a matter of course, so that a user of the personal computer 1 may take advantage of various data download services optionally.

The content data downloaded from the content server 91 to the personal computer 1 covers SDMI-compliant content data, or otherwise, content data that is unconformable to the SDMI.

A transmission line that forms the network 110 may be a wired or wireless public line network or a leased line between the personal computer 1 and the content server 91. Specifically, as the network 110, the Internet, a satellite communication network, an optical fiber network and other various kinds of communication lines, for instance, may be applied.

In addition, content data such as music reproduced from package media 90 (which will be hereinafter also referred to as a disk 90) such as a CD-DA and a DVD by an integrated or externally mounted disk drive device may be also stored in the HDD 5 of the personal computer 1.

The secondary recording medium side equipment 20A or 20B is connected to the personal computer 1 to thereby make the content data stored in the HDD 5 transferable to the secondary recording medium side equipment 20A or 20B. The secondary recording medium side equipment 20A or 20B is arranged as a recording device (a recording/reproducing device) that is compatible with the secondary recording medium. Then, it is also arranged that the content data having been transferred from the personal computer 1 may be copied and recorded in the secondary recording medium.

Although an embodiment of the secondary recording medium side equipment 20A or 20B is supposed to be available in various types, the secondary recording medium side equipment 20B as used herein is limited to an SDMI-compliant recording device. The SDMI-compliant recording device will be described later in terms of a data path with reference to FIG. 2. An SDMI-compliant memory card realized by using a semiconductor memory such as a flash memory, for instance, is supposed to be available as the secondary recording medium inserted into the SDMI-compliant recording/reproducing device 20B. Thus, the secondary recording medium side equipment 20B is arranged as the recording/reproducing device that is compatible with the SDMI-compliant memory card, for instance. In this case, it is arranged that the SDMI contents should be recorded in an encrypted state in the secondary recording medium.

On the other hand, the secondary recording medium side equipment 20A is equivalent to the data recording device as mentioned herein, and is to record SDMI contents, which need to be subject to copyright protection, in a decrypted state in the secondary recording medium, as will be described later in detail. A minidisk is available as the secondary recording medium as used herein, for instance. Thus, the secondary recording medium side equipment 20A is arranged as a minidisk recording/reproducing device. The secondary recording medium side equipment 20A will be hereinafter also referred to as the recording/reproducing device 20A in some cases.

However, as the media used for the secondary recording medium side equipment 20A for recording and reproducing, a memory card realized by using a semiconductor memory such as a flash memory; a minidisk serving as an magneto optical disk; a CD-R (CD Recordable); a CD-RW (CD Rewritable); a DVD-RAM; a DVD-R; a DVD-RW and the like are supposed to be also available, in addition to the minidisk. Thus, the secondary recording medium side equipment 20A may be a recording device that is compatible with these media.

The personal computer 1 and the secondary recording medium side equipment 20A or 20B are connected on the basis of transmission standards such as USB (Universal Serial Bus) and IEEE1394, for instance. A connection that enables a transfer of content data and the like over a wired or wireless transmission line that conforms to different transmission standards will be also enough, as a matter of course.
2. Data Path of SDMI Contents FIG. 2 shows a data path established by the SDMI on an assumption that the system shown in FIG. 1 is in use, for instance.

Incidentally, this data path is a data path that is concerned with a processing of storing music contents and transferring the music contents to external equipment (the secondary recording medium side equipment 20A, 20B) in the personal computer 1 having the HDD 5 as the primary recording medium, for instance, and in other words, is realized with software that runs the music content storage/transfer processing in the personal computer 1.

Figure 2:
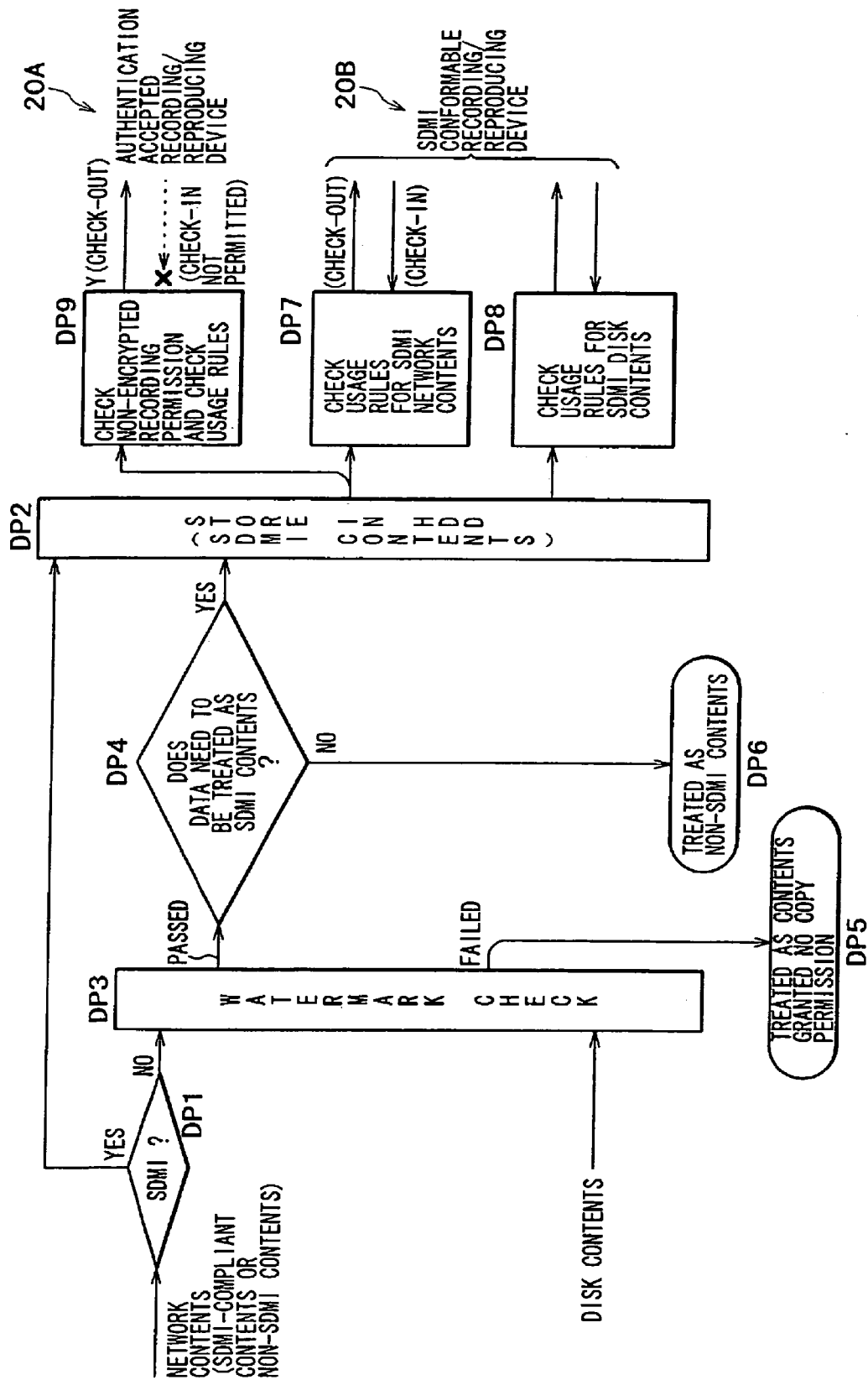
FIG. 2 illustrates a data path of SDMI contents according to the embodiment.

A procedure/processing on the data path in FIG. 2 is marked with numerals of DP1 to DP9, and hence, corresponding parts will be represented by these numerals in the following description.

It is first ascertained that content data (network contents) delivered from the content server 91 over the network 110 is SDMI-compliant contents to be subject to copyright protection or not (DP1).

The network contents to be delivered include contents received from the server side as contents that conform to the SDMI (which will be hereinafter referred to as SDMI-compliant contents) and contents irrelevant to the SDMI (which will be hereinafter referred to as non-SDMI contents).

Then, in a case of the SDMI-compliant contents, data thereof is already encrypted with a content key CK by a key encryption such as a DES, for instance. If the content data itself is assumed to be originally ATRAC 3 or other compression system encoded data, the SDMI-compliant contents are delivered in a state of "E (CK, A3D)".

When the delivered network contents are the SDMI-compliant contents, these contents are stored as SDMI contents in the HDD 5 serving as the primary recording medium (DP1→DP2).

In this case, the content data is written on the HDD 5 in the state of delivered "E (CK, A3D)". Alternatively, the content data may possibly be written on the HDD 5 in a state of "E (CK', A3D)" after being encrypted with a different key CK' upon completion of once a decryption, that is, after a replacement of a key with a different key.

On the other hand, when the network contents are the non-SDMI contents, a watermark check, that is, a screening processing based on a digital watermark is required (DP1→DP3).

In addition, the watermark check is directly performed on the content data (disk contents) read out from the package media such as the CD-DA and the DVD to be reproduced by an integrated drive such as a CD-ROM drive integrated in the personal computer 1 or a disk drive device connected to the personal computer 1, for instance (DP3).

That is, the watermark check needs to be performed on the non-SDMI content data.

When the content data fails to pass the watermark check, the failed content data is treated as data that is not granted a copy permission so far as the SDMI data path is concerned (DP3→DP5). While various ways of specific treatments are conceived to be possible depending on software design, it is supposed that the content data is treated as data that is impossible to be transferred to other media for copying/moving, although being granted a permission to be stored in the HDD 5, or otherwise, as data that is not granted a permission to be stored in the HDD 5 in the course of a processing of the SDMI-compliant contents.

When the content data passes the watermark check, that is, the presence of the digital watermark and a copy permission as a copy control bit are made sure, the passed content data is decided to be legally copyable content data, and then, it is further ascertained that the content data needs to be treated as SDMI-compliant contents or not (DP4). Whether or not the content data needs to be treated as the SDMI-compliant contents may be decided depending on software design, user setting and the like.

When there is no need to treat the content data as the SDMI-compliant contents, the content data is excluded from the pertinent SDMI-compliant content data path as data treated as non-SDMI contents (DP6). A transfer and the like to a recording device that is unconformable to the SDMI, for instance, may be also supposed to be applicable.

On the other hand, when there is a need to treat the content data as the SDMI-compliant contents, the content data is encrypted, and is then stored as the SDMI contents in the HDD 5 (DP4→DP2). The content data is stored in the state of "E (CK, A3D)" or "E (CK', A3D)" in the HDD 5, for instance.

The above-mentioned data path realizes that the contents (SDMI network contents) obtained over the network 110 as contents to be treated as SDMI-compliant contents or the contents (SDMI disk contents) fetched out from the disk such as the CD-DA or different media as contents to be treated as SDMI-compliant contents are stored in the HDD 5 serving as the primary recording medium.

The SDMI contents (the SDMI network contents or the SDMI disk contents) stored in the HDD 5 are transferred to the SDMI-compliant recording/reproducing device 20B and are granted a permission to copy onto the SDMI-compliant secondary recording medium under predetermined rules. In a case of the present embodiment, the above SDMI contents are also made transferable to the recording/reproducing device 20A under predetermined conditions, in addition to the SDMI-compliant recording/reproducing device 20B.

A processing when the SDMI-compliant recording/reproducing device 20B is connected to the personal computer 1 having the HDD 5 is as follows.

In a case of the SDMI disk contents, rules (Usage Rule) for a transfer that is adaptive to the SDMI disk contents are determined, and a transfer for copying to the SDMI-compliant recording/reproducing device 20B is authorized under the usage rules (DP8).

Incidentally, a transfer for copying from the primary recording medium (the HDD 5) to the secondary recording medium (such as the memory card) to be recorded and/or reproduced with the SDMI-compliant recording/reproducing device 20B is called "check-out". On the contrary, a transfer for moving from the secondary recording medium to the primary recording medium is called "check-in". Incidentally, in a case of moving from the secondary recording medium to the primary recording medium, the moved content data is brought into an erased state on the secondary recording medium.

With regard to the usage rules for the transfer that is adaptive to the SDMI disk contents, an upper limit on check-out counts is predetermined so as to permit check-out up to three times per content data, for instance. Thus, copying is permitted up to three SDMI-compliant secondary recording mediums, for instance. In addition, when the check-in is conducted, it means that the check-out count on the pertinent content data is subtracted. Thus, if the content data is subjected to the check-in from one of the three SDMI-compliant secondary recording mediums even after having been copied onto the three SDMI-compliant recording mediums, the contents may be copied once more onto the SDMI-compliant secondary recording medium. That is, the content data is allowed to always coexist in the three SDMI-compliant secondary recording mediums at the maximum.

In a case of the SDMI network contents, rules (Usage Rule) for a transfer that is adaptive to the SDMI network contents are also determined, and a transfer for copying to the SDMI-compliant recording/reproducing device 20B is authorized under the usage rules (DP7).

While the usage rules are to determine an upper limit on check-out counts and the like in the same manner as the above, the upper limit count and the like may be equal to or different from the usage rules in a case of the SDMI disk contents. For instance, there may be a case where check-out is limited to once. In this case, although the copy permission is given only to one of the other SDMI-compliant secondary recording mediums per content data, a transfer for copying is made permissible again as long as the check-in is conducted from the pertinent secondary recording medium.

When the SDMI contents are transferred for copying onto the SDMI-compliant secondary recording medium according to these usage rules, data transmission is realized as it is in an encrypted state on the transmission line. That is, the SDMI contents are transferred in the state of "E (CK, A3D)" or "E (CK', A3D)" as described above, for instance.

Further, the SDMI-compliant recording/reproducing device 20B, upon a reception of the SDMI contents sent encrypted, copies and records the SDMI contents as they are in the encrypted state in the secondary recording medium.

When the SDMI contents copied and recorded in the secondary recording medium are reproduced by the SDMI-compliant recording/reproducing device 20B, the content data read out from the secondary recording medium is decrypted and reproduced. That is, the content data recorded in the state of "E (CK, A3D)" or "E (CK', A3D)" in the secondary recording medium is decrypted with the key CK or CK'.

That is, the original content data is obtained as decrypted ATRAC 3 data (A3D) as "D {CK, E (CK, A3D)}"=A3D or "D {CK', E (CK', A3D)}"=A3D. A processing inclusive of decompression to ATRAC 3 compression is performed on the content data for reproduction output of music and the like through demodulation as audio data, for instance.

As described above, the SDMI-compliant content data takes the form of encrypted data on the data path up to a point when the check-out is conducted by the SDMI-compliant recording/reproducing device 20B and further until the secondary recording medium is reached, or a copy management is realized by the transfer usage rule check, so that a copyright protection on the content data may be properly made.

On the other hand, when the recording/reproducing device 20A is connected to the personal computer 1, the following processing is taken.

Incidentally, the recording/reproducing device 20A is to record data in a decrypted state in the minidisk and the like serving as the secondary recording medium, for instance, differently from the SDMI-compliant recording/reproducing device 20B. Owing to recording in the decrypted state, the content data copied and recorded in the minidisk is made reproducible even by a normally available minidisk reproducing device that prevails in general, resulting in an improvement on user's convenience.

However, recording in the decrypted state brings about a disadvantage in view of copyright protection. In this connection, it is necessary to satisfy predetermined conditions in a case of transferring the content data to the recording/reproducing device 20A.

The conditions that are granted a permission to transfer the SDMI network contents to the recording/reproducing device 20A for copying and recording in the secondary recording medium in the decrypted state are considered to be the following three conditions, that is, (1) authentication to the recording/reproducing device 20A is accepted, (2) a copyright holder agrees copying and recording on the content data to be transferred and (3) no check-in is permitted.

If these three transfer conditions (1)(2)(3) are satisfied, an unrestricted transfer for copying to the equipment other than the SDMI-compliant recording/reproducing device 20B is not permitted, and besides, a copyright protection function is also kept secure. In addition, the copyright protection function may be given also on condition that the content data should be placed in an encrypted state on the transmission line that performs the transfer (a decryption is performed on the side of recording/reproducing device 20A).

The above transfer conditions (1)(2)(3) are checked in a case of transferring the SDMI network contents to the recording/reproducing device 20A (DP9).

That is, a predetermined authentication processing is performed on the recording/reproducing device 20A. In addition, a copyright holder's intention to give the copy permission is ascertained on the basis of flag information contained in the content data. Further, the check-in/check-out rules are also imposed.

In a case of transferring the SDMI network contents to the recording/reproducing device 20A, data is sent as it is in the encrypted state over the transmission line according to these conditions. That is, the SDMI network contents are transferred in the above-mentioned state of "E (CK, A3D)" or "E (CK', A3D)", for instance.

Then, the encrypted SDMI network contents are decrypted by a decrypting unit 28 into original ATRAC 3 compressed data (A3D), for instance, after being subject to a reception processing in the recording/reproducing device 20A having a configuration shown in FIG. 4, as will be described later. Then, the decrypted content data is supplied to a recording/reproducing unit 25 through an encoding processing performed by an encoding/decoding unit 24, and is recorded in the minidisk 100.

Thus, when the SDMI contents copied and recorded in the minidisk 100 are reproduced by the recording/reproducing device 20A, a decode processing required in a normally available minidisk system, that is, EFM demodulation, ACIRC error correction, decompression to the ATRAC compressing system and the like will be enough for the data read out from the minidisk 100.

This means that the minidisk 100, in which the content data is copied and recorded, is permitted to reproduce the content data in a normal manner, even when the minidisk is loaded in the normally available minidisk reproducing device. That is, the user may enjoy music and the like by allowing the normally available minidisk reproducing device that is not SDMI-compliant to reproduce the copied and recorded SDMI network contents in the minidisk 100, as described above.

Incidentally, in the data path shown in FIG. 2, when no transfer permission is given as a result of the usage rule check and the like in DP7, DP8 and DP9, it is needless to say that no transfer to the recording/reproducing device 20A or 20B occurs.

3. Embodiment of Configuration of Data Transfer Device (Primary Recording Medium Side Equipment/PC)

Figure 3:
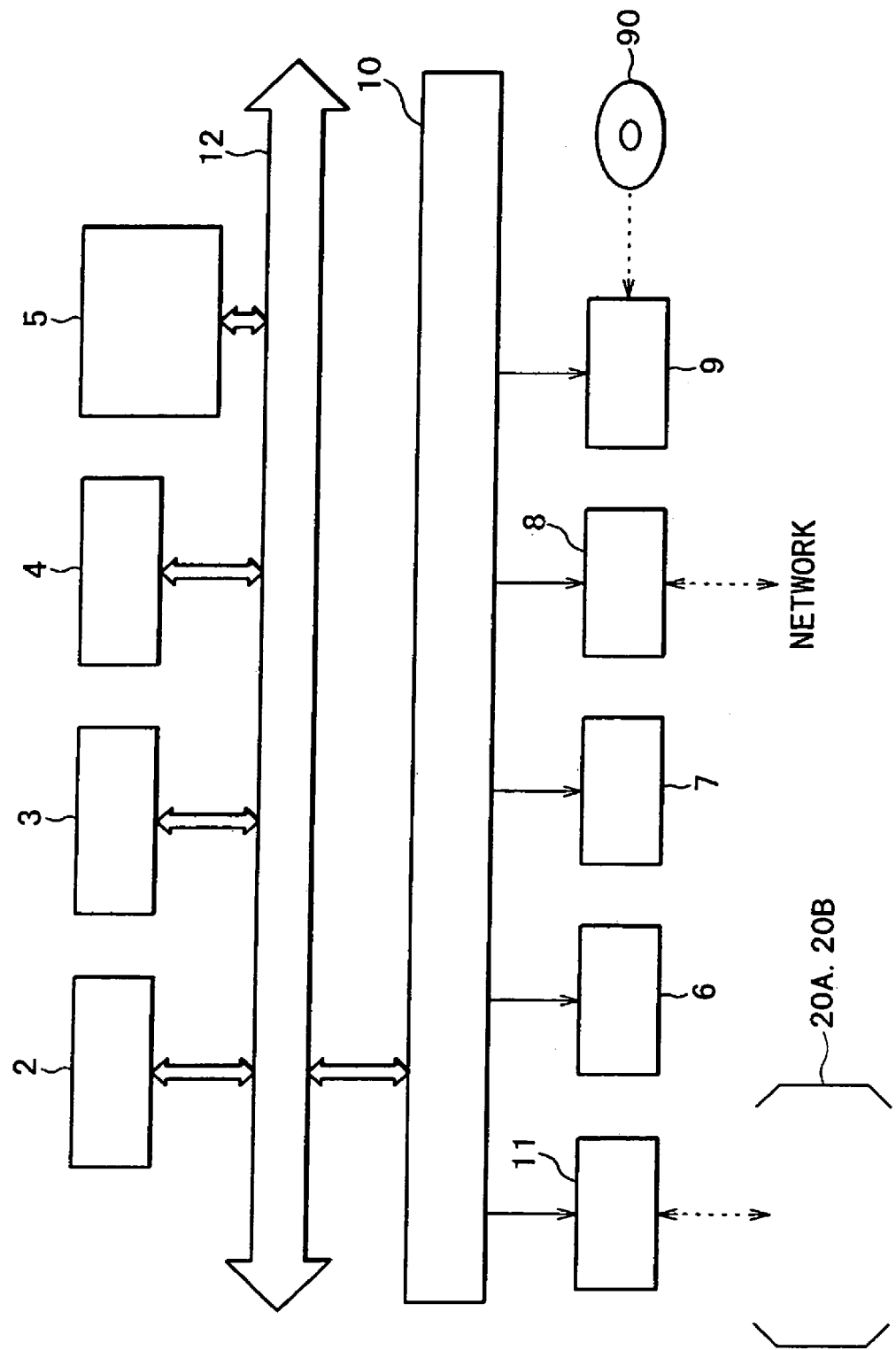
FIG. 3 is a block diagram showing primary recording medium side equipment according to the embodiment.

FIG. 3 shows a configuration of the primary recording medium side equipment 1 that operates as the data transfer device. Incidentally, although an embodiment as mentioned herein relates to a case of the primary recording medium side equipment 1 made up of a personal computer, the primary recording medium side equipment may be also formed as the equipment exclusively for data transfer by using dedicated hardware to build a configuration having the similar functions.

In a case of the present embodiment, the primary recording medium side equipment that provides the data transfer device is realized by installation of a software program, which allows the personal computer 1 to perform functions required as functions of the data transfer device. Incidentally, the term "personal computer" or "computer" as used herein denotes a so-called general-purpose computer in a broad sense.

The program may be preliminarily recorded in a ROM 3 or the hard disk (HDD) 5 serving as the recording medium integrated in the computer.

Alternatively, the program may be also temporarily or permanently stored (recorded) in a removable recording medium, such as a floppy disk; a CD-ROM (Compact Disc Read only Memory); an MO (Magneto Optical) Disk; a DVD (Digital Versatile Disc); a magnetic disk and a semiconductor memory. The removable recording medium may be provided as so-called package media and is equivalent to the package media 90 shown in FIG. 1.

Incidentally, the program may be radio-transferred from a download site to the computer over a digital satellite broadcasting earth satellite or wire-transferred over a network such as a LAN (Local Area Network) and the Internet, in addition to the installation from the package media 90 into the computer as described above, so that the computer may receive the program transferred as described above with a communication unit 8 for installation into the integrated HDD 5.

The computer 1 shown in FIG. 3 has a CPU (Central Processing Unit) 2 integrated therein. An input/output interface 10 is connected to the CPU 2 via a bus 12. When an input unit 7 made up of a keyboard, a mouse, a microphone and the like is operated by the user to input a command through the input/output interface 10, the CPU 2 executes a program stored in the ROM (Read Only Memory) according to the command. Alternatively, the CPU 2 also loads a program stored in the HDD 5, a program transferred over the satellite or the network and then received by the communication unit 8 for installation into the HDD 5, or a program read out from the package media 90 such as the optical disk loaded in the drive 9 for installation into the HDD 5, to the RAM (Random Access Memory) into execution. Thus, the CPU 2 performs a processing required as a processing of the data transfer device on the SDMI contents as will be described later.

Then, the CPU 2 allows a result of the processing to be outputted from an output unit 6 comprised of a LCD (Liquid Crystal Display) and a speaker through the input/output interface 10, for instance, or to be sent through the communication unit 8, or to be recorded in the HDD 5, at need.

In a case of the present embodiment, the communication unit 8 is arranged to permit communication with various kinds of servers over the network 110 shown in FIG. 1. That is, the computer 1 enables to download the network contents such as the music content from the external content server 91. A processing required as the processing on the SDMI-compliant contents or the non-SDMI contents is performed on the network contents to be downloaded in accordance with the above data path, and the above network contents are stored as the SDMI contents in the HDD 5 at least as the SDMI-compliant processing, for instance. The SDMI contents stored in the HDD 5 provide contents to be transferred to the SDMI-compliant secondary recording medium side equipment 20B or the authenticated secondary recording medium side equipment (the recording/reproducing device) 20A.

A connection unit 11 is a portion that is connected to permit data communication with the secondary recording medium side equipment 20A or 20B. A USB interface, an IEEE 1394 interface and the like are supposed to be available, for instance. A wired interface that conforms to different standards and a wireless interface realized by using infrared rays and electric waves are also available, as a matter of course.

Incidentally, various kinds of processing for realizing the data path as described with reference to FIG. 2 include also parallel or individually executed processings (a parallel processing or a processing depending on an object, for instance) without the need for a processing in time series respectively.

In addition, the program may be a program that is processed with a single computer or is subjected to a distributed processing with a plurality of computers. Further, the program may be also a program that is transferred to a remote computer into execution.

4. Embodiment of Configuration of Data Recording Device (Secondary Recording Medium Side Equipment/Recording/Reproducing Device)

Figure 4:
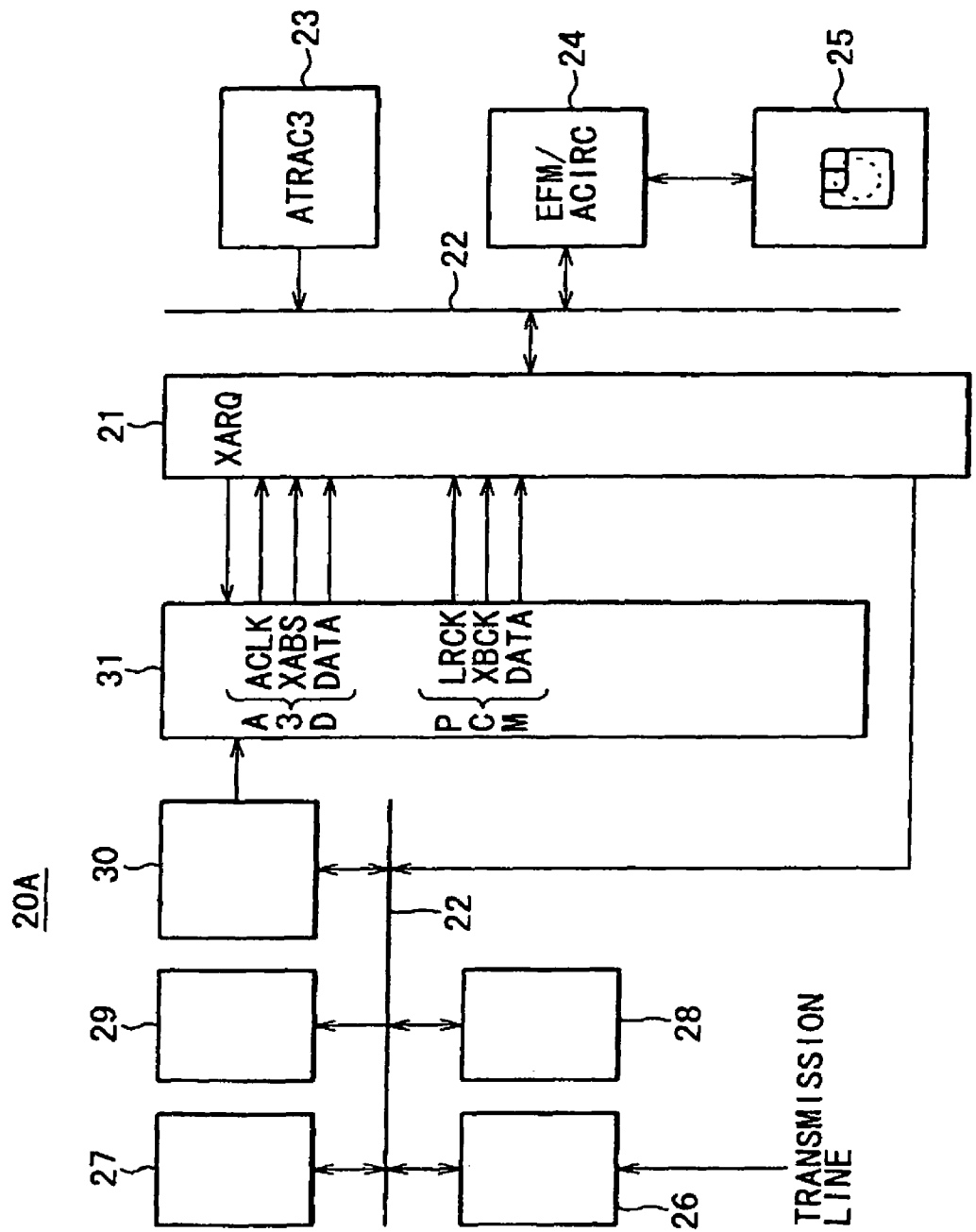
FIG. 4 is a block diagram showing secondary recording medium side equipment according to the embodiment.

FIG. 4 shows a configuration of the secondary recording medium side equipment (the recording/reproducing device) 20A equivalent to the data recording device of the present invention.

An embodiment shown relates to the recording/reproducing device 20A configured as a minidisk recorder, for instance. Thus, the minidisk (the magneto optical disk) is applied as an embodiment of the secondary recording medium 100. The secondary recording medium 100 will be hereinafter also referred to as the minidisk 100.

Incidentally, only a processing system of recorded and/or reproduced data to the minidisk serving as the secondary recording medium 100 and a processing system adaptive to the data transfer from the primary recording medium side equipment 1 are shown in FIG. 4, while a drive system, a servo system and a reproducing output system and the like that are compatible with the minidisk 100 are equal to those of the normally available minidisk recording/reproducing device, and hence, their detailed description will be omitted.

An MD control unit (CPU) 21 is arranged as a system controller that controls the whole system serving as the recording/reproducing device 20A. Specifically, for recording and reproduction to the minidisk 100, the MD control unit performs controls on a rotational drive, a spindle servo, a focus servo, a tracking servo and a thread servo, controls on laser beams of an optical head/a magnetic head and a magnetic field application operation and controls on a encoding/decoding processing on data to be recorded and reproduced. In addition, controls on an exchange of instructions on communication with the personal computer 1 for authentication or generation of data, as well as various kinds of commands from the personal computer 1, and a processing on the content data to be transferred and the like are also performed.

Although not shown, an operating unit and a display unit are also provided as a user interface, so that controls on monitoring of a user's operation performed through the operating unit, a processing depending on an operation and display on the display unit and the like are also performed.

The recording/reproducing unit 25 is a portion that is equipped with an optical head, a magnetic head, a disk rotational drive system, a servo system and the like for practically performing recording and/or reproduction of data to the minidisk 100.

The encoding/decoding unit 24 encodes data to be recorded in the minidisk 100 and also decodes the data reproduced from the minidisk 100. In a case of the minidisk system, an ACIRC error correction code encoding processing and an EFM modulation processing are performed on the data to be recorded, as well known in public. The encoding/decoding unit 24 thus performs ACIRC encoding and EFM encoding on the data to be recorded for supplying them to the recording/reproducing unit 25.

In addition, in a case of reproduction, the encoding/decoding unit also performs a decoding processing such as a binary-coded processing, an EFM demodulation and an ACIRC error correction processing on data (a RF signal) having been read out and supplied from the recording/reproducing unit 25.

A codec 23 is a portion that performs a compression processing by means of ATRAC/ATRAC 3 compression encoding and also a decompression processing.

The data to be recorded in the minidisk 100 is considered to be data having been subjected to the above encoding processing upon completion of the ATRAC/ATRAC 3 compression encoding. Thus, when data having not been subjected to the compression encoding yet, that is, PCM audio data, for instance, is inputted to the recording/reproducing device 20A as data to be recorded, the ATRAC or ATRAC 3 compression encoding is performed by the codec 23, so that the compressed data is supplied to the encoding/decoding unit 24.

In addition, in a case of the reproduction, the data having been read out by the recording/reproducing unit 25 and then decoded by the encoding/decoding unit 24 is considered to be ATRAC or ATRAC 3 compressed data. For that reason, digital audio data of 44.1 KHz and quantization with 16 bits, for instance, is demodulated as a result that the decompression processing to the ATRAC or ATRAC 3 compression is performed by the codec 23. In a circuit of an output system not shown, the digital audio data is subjected to a D/A conversion, an analog signal processing, an amplification processing and the like into a speaker output signal, which is then reproduced as music and the like.

Alternatively, output in the state of the digital audio data to the other equipment is also applicable.

While the above configuration relates to components that are also equipped in the recording/reproducing device of the normally available minidisk system, the recording/reproducing device 20A as used herein is provided with a receiver 26, a DMA 27, a decrypting unit 28, a cache memory 29, a dummy bit addition unit 30 and a flow control unit 31 as portions that are compatible with the personal computer serving as the primary recording medium side equipment 1, as well as portions that perform a reception/decryption processing on the transferred content data.

The receiver 26 is a portion that is connected to a portion between the recording/reproducing device and the connection unit 11 of the personal computer 1 of FIG. 3 for establishing data communication with the personal computer 1. The receiver performs a signal processing that conforms to a communication system such as the USB and the IEEE1394, for instance.

Communication from the personal computer 1 covers various kinds of commands, the SDMI contents and the like as data received by the receiver 26.

The data as the SDMI contents received by the receiver 26 comes to be stored in the cache memory 29 under control of the DMA (Direct Memory Access) 27. Incidentally, it does not matter if data is moved to the cache memory 29 under control of the CPU, instead of the DMA 27.

The decrypting unit 28 is a portion that needs to be adaptive to the encryption processing on the SDMI contents. That is, keys (the keys CK, CK' and the like) for decrypting the SDMI contents transferred in the encrypted state are placed, so that the decrypting unit decrypts the SDMI contents having been received in the state encrypted with the key CK and the like, such as the contents in the state of "E (CK, A3D)" for instance. That is, decrypted ATRAC 3 compressed data is made obtainable as "D {CK, E (CK, A3D)}"=A3D.

The key CK and the like may be a preliminarily stored key or a key sent from the personal computer 1 serving as the data transfer device to the recording/reproducing device 20A at a predetermined period of time may be also applied as a key to be stored. In addition, when the personal computer 1 sends the key CK and the like, it does not matter if the key CK itself is also encrypted with a different key CCK, and a decryption of the key CK is performed using the key CCK on the side of the recording/reproducing device 20A in advance of a storage in the cache memory 29.

Incidentally, it is to be understood that the SDMI contents are not always data resulting from encrypting the ATRAC 3 compressed data. There is also a case where "E (CK, PCM)" state contents resulting from encrypting the linear PCM data with the key CK, for instance, is transferred and inputted. In this case, decrypted linear PCM data is made obtainable as "D {CK, E (CK, PCM)}"=PCM through the processing in the decrypting unit, as a matter of course.

When the decrypted SDMI content data is the ATRAC 3 compressed data, a dummy bit addition processing is performed in the dummy bit addition unit 30 on the decrypted SDMI contents in advance of a transfer to the flow control unit 31.

When the decrypted SDMI content data is the PCM data, a transfer to the flow control unit 31 is performed without passing through the processing in the dummy bit addition unit 30.

The dummy bit addition unit 30 is a portion that 15 adds dummy bits in order to make the ATRAC 3 compressed data conformable to a data format that is treated in the minidisk system, and its specific embodiment will be described later.

The flow control unit 31 is a portion that transfers the received and decrypted SDMI contents toward the MD control unit 21 (to the codec 23, the encoding/decoding unit 24 and the recording/reproducing unit 25) serving as a recording processing system in order to record the decrypted SDMI contents in the minidisk 100, and particularly, performs a control for bringing a transfer of the above SDMI content data into practice efficiently.

A transfer operation by the flow control unit 31 will be described later in detail.

According to the above configuration, when the SDMI content data having been sent from the personal computer 1 is the "E (CK, A3D)" state data, the received and decrypted ATRAC3 compressed data is transferred to the recording processing system through the flow control unit 13 after being subjected to the processing by the dummy bit addition unit 30, and is recorded in the minidisk 100 by the recording/reproducing unit 25 through the encoding processing in the encoding/decoding unit 24.

In addition, when the SDMI content data having been sent from the personal computer 1 is the "E (CK, PCM)" state data, the received and decrypted PCM data is transferred to the recording processing system through the flow control unit 31 to perform the ATRAC 3 compression processing on the PCM data by the codec 23, and thereafter, is recorded in the minidisk 100 by the recording/reproducing unit 25 through the encode processing in the encoding/decoding unit 24.

Incidentally, in a case of sending the content data, various kinds of commands are also sent from the personal computer 1 to the recording/reproducing device 20A.

In a case of performing the transfer of the content data as well as the recording of the content data in the minidisk 100, the CPU 2 of the personal computer 1 sends each of the following commands to the MD control unit 21 of the recording/reproducing device 20A:

To give information of a compression system and a bit rate of target content data to be sent, which is stored in the HDD 5

To give information of a compression system and a bit rate of content data required for a case of sending the content data to the transmission line To specify a compression system in a case of recording the content data in the minidisk 100 (to specify either of 132 kbps of ATRAC/ATRAC 3 and 66 kbps of ATRAC 3)

These commands are transmitted to the MD control unit 21 upon reception by the receiver 26, so that the MD control unit 21 needs to perform a signal processing control and/or a recording processing control required in a case of an operation of capturing the received content data in response to these commands.

The MD control unit 21 may judge received content data to be the "E (CK, A3D)" state data or the "E (CK, PCM)" state data by these commands, for instance, and therefore, performs a signal processing suited to a data format of the received content data as described above.

5. Processing in a Case of Transmitting Contents

As a processing in a case of transferring the content data from the personal computer 1 to the recording/reproducing device 20A, a processing of the CPU 2 of the personal computer 1 is shown in FIG. 5, and a control processing of an operation that the MD control unit 21 of the recording/reproducing device 20A allows each part to perform is shown in FIG. 6.

The processing of the CPU 2 of the personal computer 1 will be firstly described.

In a case of transferring certain content data stored in the HDD 5, the CPU 2 decides whether or not a compression system of the stored content data is equal to a compression system required for a case of recording in the secondary recording medium as Step F101 shown in FIG. 5.

In a case where the ATRAC 3-compliant minidisk recording device is connected as the secondary recording medium side equipment 20A, the CPU 2 may judge the compression system in the secondary recording medium to be ATRAC or ATRAC 3. In this case, since the CPU 2 specifies the compression system and the bit rate required for the case of recording to the MD control unit 21 in response to the above commands, it is necessary to ascertain the specified compression system and the compression system of the content data. A description will now be given on the assumption that the CPU 2 specifies the bit rate of 132 kbps in the ATRAC 3 system to the MD control unit 21.

In this case, the CPU 2 decides in Step F101 whether or not the compression system of the content data to be transferred is the ATRAC 3 system.

Figure 18:
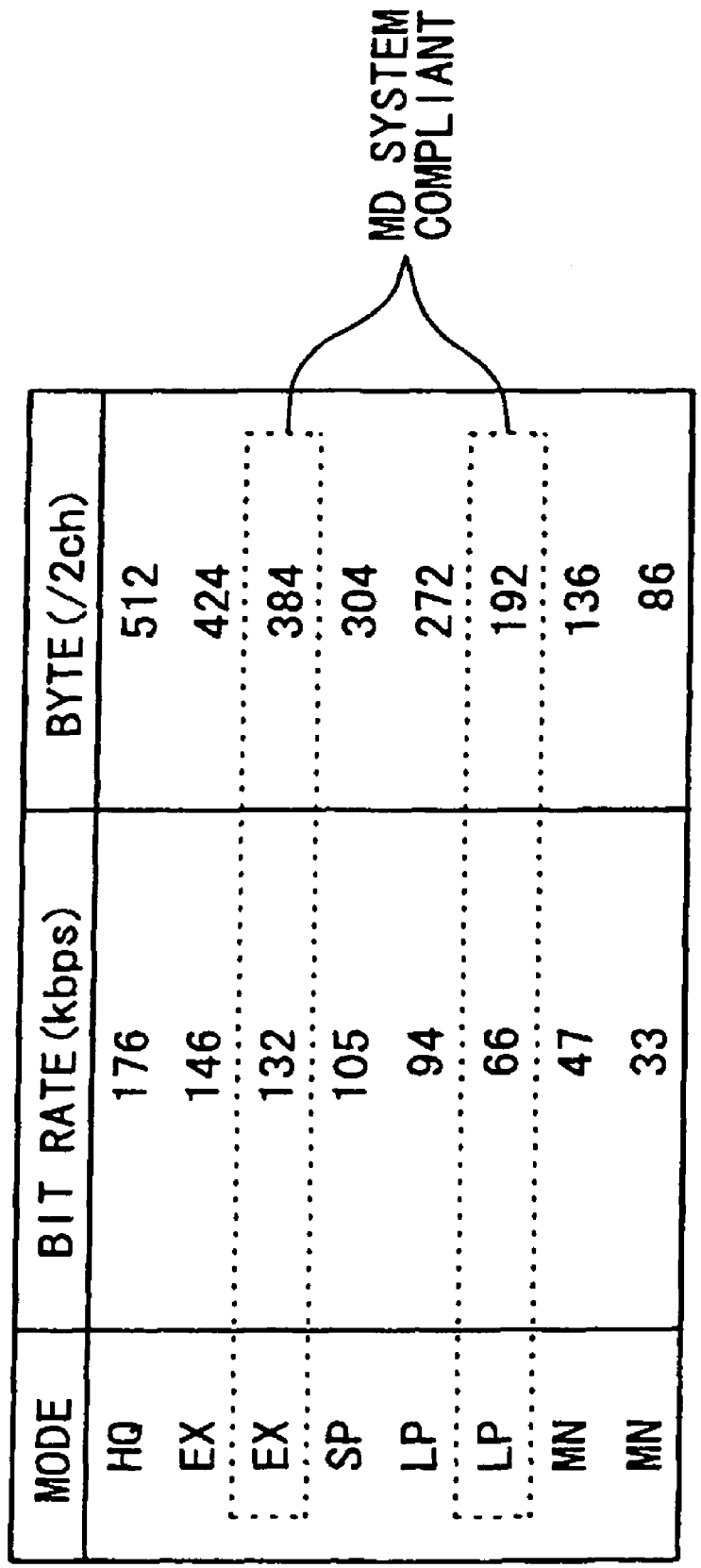
FIG. 18 illustrates bit rates of an ATRAC 3 system.

In a case where the compression system of the content data is the ATRAC 3 system, the bit rate of the content data is ascertained in subsequent Step F102. While the bit rate in a case of the ATRAC 3 system is available in various kinds as shown in FIG. 18, it is decided whether the bit rate of the content data to be transferred is equal to or lower than the bit rate on the secondary recording medium side, that is, 132 kbps in this case.

That is, it is decided whether the bit rate of the content data is 176 or 146 kbps or any other bit rate (in the range from 132 to 33 kbps).

In a case where the compression system of the content data to be transferred is judged to be the ATRAC 3 system, and where the bit rate is judged to be not more than the bit rate on the secondary recording medium side (the minidisk side), as the result of a decision in Steps F101 and F102, the processing is advanced to Step F106 intact to send a content data stream read out from the HDD 5 to the transmission line without the need for any data conversion processing in particular.

In this case, the content data comes to be supplied in the state of "E (CK, A3D)" to the recording/reproducing device 20A.

On the other hand, when the content data to be transferred is judged to be compressed data other than ATRAC 3 compressed data, or the bit rate is higher than the bit rate on the secondary recording medium side (the minidisk side) although the compression system is judged to be the ATRAC 3 system, as the result of the decision in Steps F101 and F102, the processing is advanced to Step F103 to firstly perform a decryption.

That is, the contents stored in the HDD 5, when being the ATRAC 3 compressed data "E (CK, A3D)", are decrypted into "D {CK, E (CK, A3D)}"=A3D.

On the other hand, the contents stored in the HDD 5, when being the compressed data "E (CK, aDT)" other than the ATRAC 3 compressed data, are decrypted into "D {CK, E (CK, aDT)}"=aDT.

Subsequently, in Step F104, the data decrypted as A3D or aDT is decoded (decompressed) for decompression into linear PCM data equivalent to non-compressed data.

Then, in Step F105, the PCM data is encrypted again with the key CK into encrypted data "E (CK, PCM)".

Then, the processing is advanced to Step F106 to send the "E (CK, PCM)" state content data stream to the transmission line for supplying to the recording/reproducing device 20A.

While the content data is sent from the personal computer 1 to the transmission line as described above, the CPU 2, in this case, informs of the MD control unit 21 about the compression system and the bit rate of the content data to be supplied over the transmission line in response to the above commands.

A description will now be given of a processing of the MD control unit 21 of the recording/reproducing device 20A serving as the reception side with reference to FIG. 6.

The MD control unit 21 decides in Step F201 whether or not the compression system of the content data received from the primary recording medium side is the compression system required for the case of recording in the minidisk 100 serving as the secondary recording medium.

In addition, in Step F202, it is also decided whether or not the bit rate of the content data received from the primary recording medium side is not more than the bit rate required for the case of recording in the minidisk 100.

That is, the MD control unit 21 may judge the compression system and the bit rate of the content data received over the transmission line according to the above commands, and the compression system and the bit rate both required for the case of recording in the minidisk 100 are specified by the commands, so that the MD control unit 21 may give a decision in Steps F201 and F202 on the basis of the above commands.

It is assumed that the compression system required for the case of recording in the minidisk 100 is the ATRAC 3 system, and the bit rate is specified as 132 kbps as described above. Then, as judging from the processing in FIG. 5, the content data supplied over the transmission line is the encrypted ATRAC 3 compressed data "E (CK, A3D)", or the encrypted PCM data "E (CK, PCM)".

Thus, in this case, in Step F201, if the supplied content data is the data "E (CK, A3D)", both the compression systems are judged to be equal.

Also, as judging from the processing in FIG. 5, all that is received in the state of "E (CK, A3D)" is the content data having the bit rate of not more than 132 kbps. Thus, if the supplied content data is the data "E (CK, A3D)", a decision in Step F202 is supposed to be given simultaneously as a matter of fact.

When the content data supplied over the transmission line is "E (CK, A3D)", that is, the compression system of the content data received from the primary recording medium side is equal to the compression system required for the case of recording in the minidisk 100, and the compression system of the content data is not more than the bit rate required for the case of recording in the minidisk 100, the processing is advanced to Step F203 to perform a decryption. That is, the decrypting unit 28 is allowed to perform the processing of "D {CK, E (CK, A3D)}"=A3D on the content data stream that is received by the receiver 26 and is then captured in the cache memory 29.

Further, the dummy bit addition unit 30 is allowed to perform the dummy bit addition processing on the decrypted content data (A3D) as Step F204.

The dummy bit addition processing in this case is considered to be a processing for making the ATRAC 3 compressed data conformable to the ATRAC 3 system data format that is treated in the minidisk system.

The minidisk system is a system that has been developed by adopting the ATRAC system originally, and is considered to be a system that is made conformable also to the ATRAC 3 system after that, with a development of the ATRAC 3 system of higher compression rate. However, since the ATRAC is different from the ATRAC 3 in compression rate and also in sound unit basis data size, a signal processing system that has been originally designed in conformity with the ATRAC system is not enough to interpret the ATRAC 3 compressed data as it is. For that reason, a special data format suited to the ATRAC system data is applied to the minidisk system-even though the ATRAC 3 is adopted as the compression system.

Thus, the dummy bit addition processing provides a processing that meets the above circumstances.

Specifically, a unit of the ATRAC system data, that is, a sound unit that provides a minimum unit on each of L and R stereophonic audio data is assumed to be data of 212 bytes. On the other hand, the ATRAC 3 compressed data has higher compression rate, so that data per sound unit becomes smaller than the data of 212 bytes. That is, it may be said that the dummy bit addition processing is equivalent to a processing of changing a data size per sound unit to 212 bytes by adding dummy bits to the ATRAC 3 compressed data.

Figure 8:
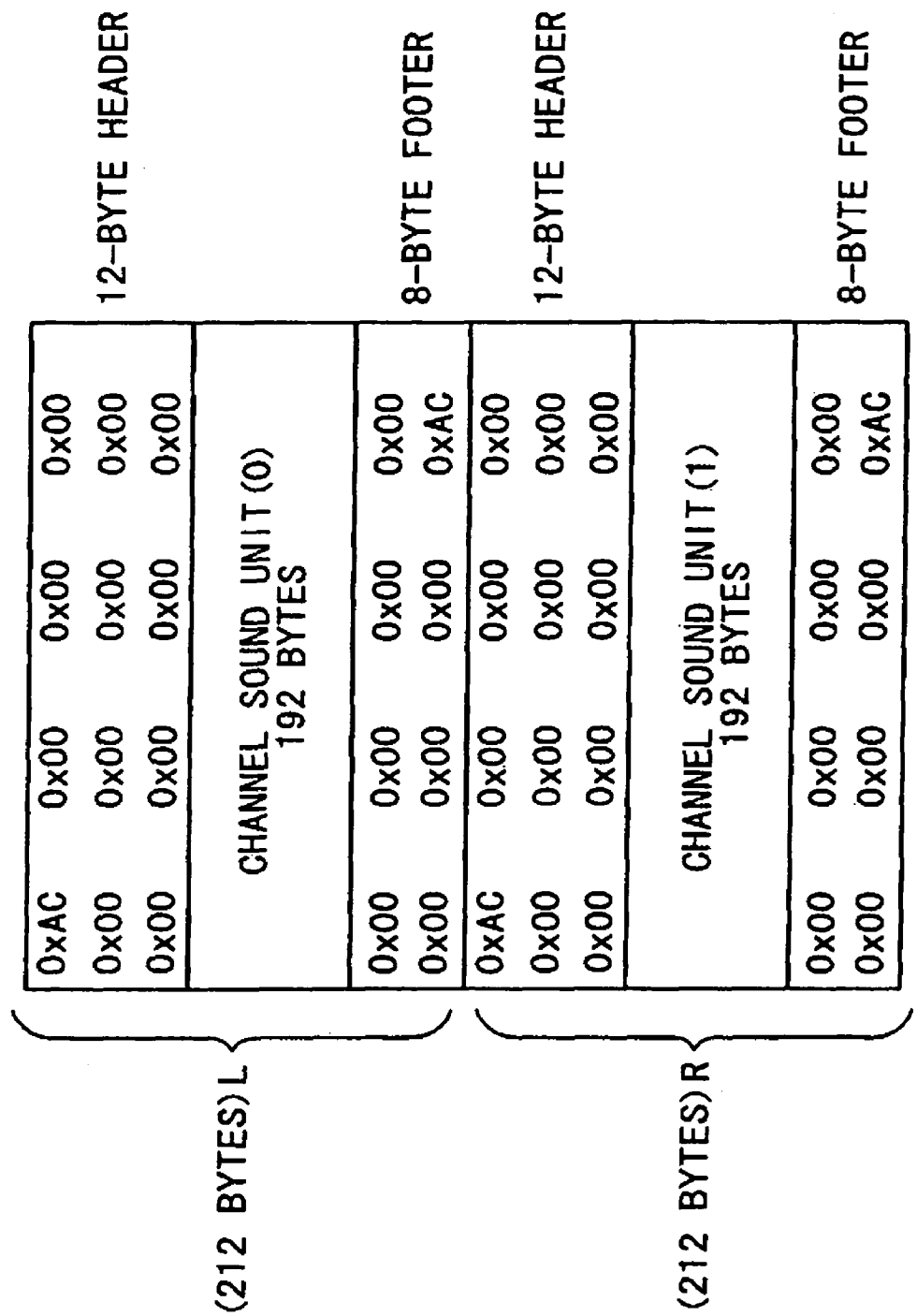
FIG. 8 illustrates a dummy bit addition processing according to the embodiment.

FIG. 8 shows an embodiment of the dummy bit addition processing when A3D content data with the bit rate of 132 kbps is received.

In a case of the bit rate being 132 kbps, the number of bytes for two channels (L/R) is 384 bytes, 192 bytes for each channel as shown in FIG. 18.

A sound unit of 192 bytes is changed to the sound unit of 212 bytes on each of L/R channels as shown in FIG. 8. That is, a sound unit of each channel is changed to the sound unit of 212 bytes by adding a 12-byte header and an 8-byte footer as dummy bits before and behind the 192-byte sound unit of the received A3D content data.

Figure 9:
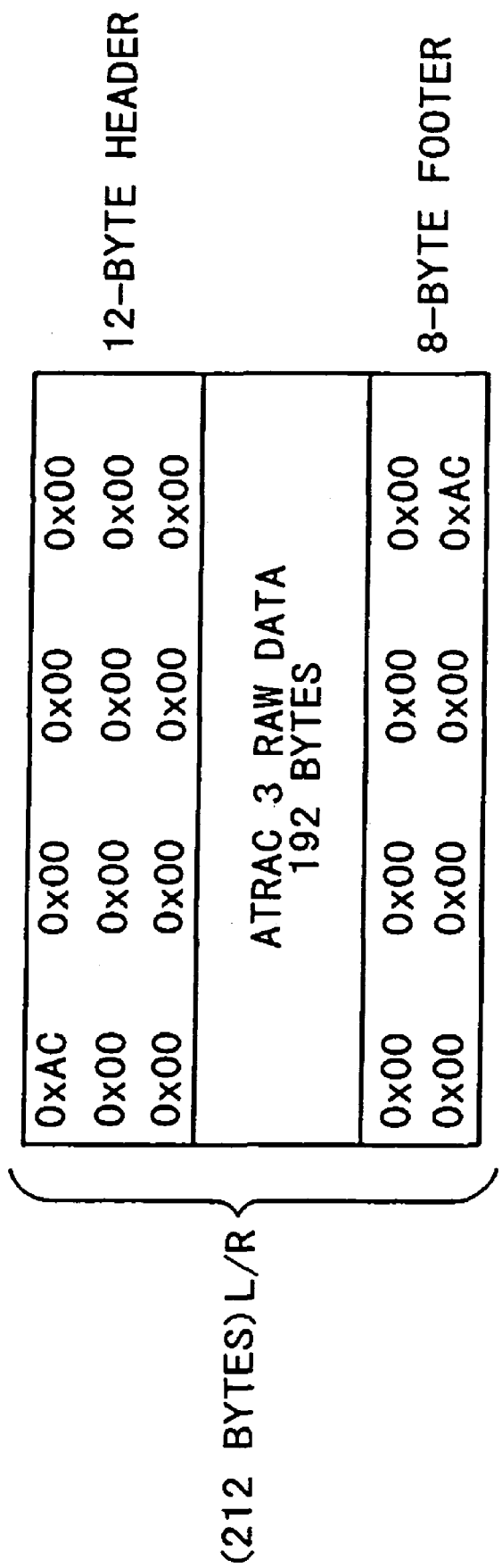
FIG. 9 illustrates a dummy bit addition processing according to the embodiment.

FIG. 9 shows another embodiment of the dummy bit addition processing when A3D content data with the bit rate of 66 kbps is received. In-addition, ATRAC 3 RAW data in this case is considered to be data of a so-called joint stereo system, that is, there is shown a case of configuring data of two, e.g., L and R channels by (L+R) data and (L−R) data.

In a case of the bit rate being 66 kbps, the number of bytes of the sound unit for two channels is 192 bytes as shown in FIG. 18. Thus, as shown in FIG. 9, a sound unit is changed to the sound unit of 212 bytes by adding a 120-byte header and an 8-byte footer as dummy bits before and behind the 192-byte L/R sound unit of the received content data.

Figure 10:
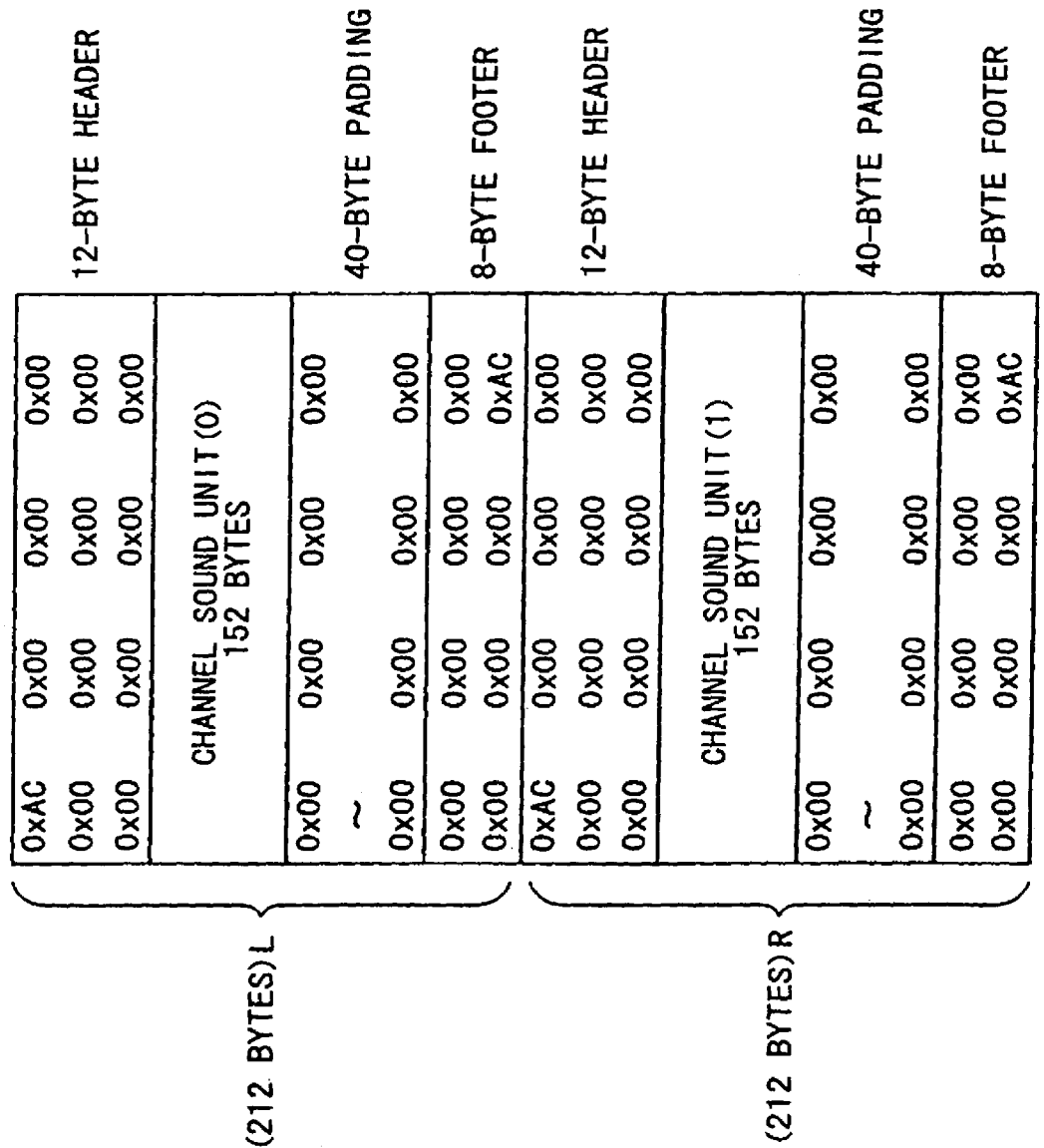
FIG. 10 illustrates a dummy bit addition processing according to the embodiment.

FIG. 10 shows the dummy bit addition processing when A3D content data with the bit rate of 105 kbps is received.

In a case of the bit rate being 105 kbps, the number of bytes for two channels (L/R) is 304 bytes, 152 bytes for each channel as shown in FIG. 18.

A sound unit of 152 bytes is changed to the sound unit of 212 bytes on each of L and R channels as shown in FIG. 10. That is, a sound unit of each channel is changed to the sound unit of 212 bytes by adding a 12-byte header, a 40-byte padding and an 8-byte footer as dummy bits before and behind the 152-byte sound unit of the received A3D content data.

Figure 11:
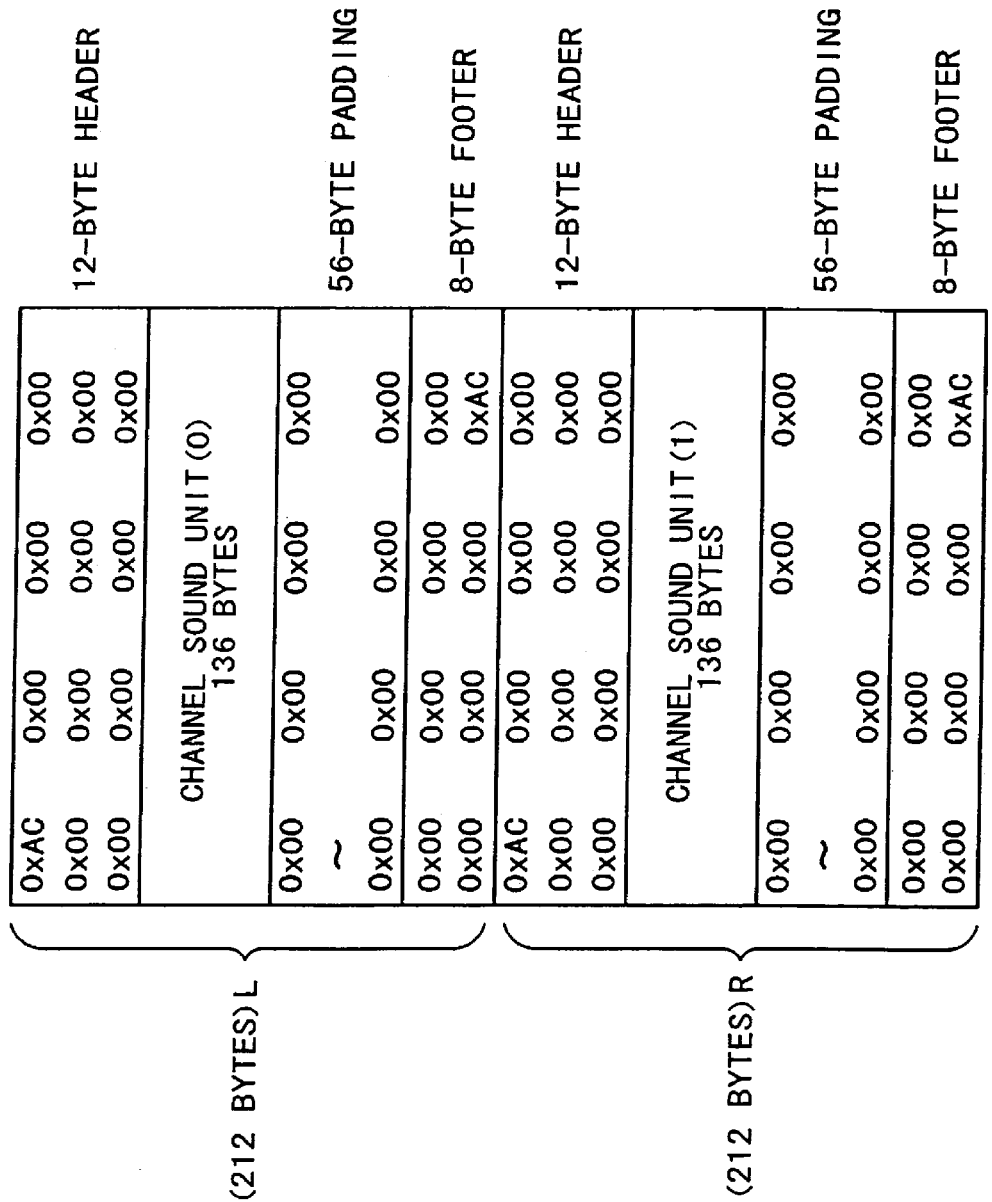
FIG. 11 illustrates a dummy bit addition processing according to the embodiment.

FIG. 11 shows the dummy bit addition processing when A3D content data with the bit rate of 94 kbps is received.

In a case of the bit rate being 94 kbps, the number of bytes for two channels (L/R) is 272 bytes, 136 bytes for each channel as shown in FIG. 18.

A sound unit of 136 bytes is changed to the sound unit of 212 bytes on each of L and R channels as shown in FIG. 11. That is, a sound unit of each channel is changed to the sound unit of 212 bytes by adding a 12-byte header, a 56-byte padding and an 8-byte footer as dummy bits before and behind the 136-byte sound unit of the received A3D content data.

In Step F204 shown in FIG. 6, the MD control unit 21 allows the dummy bit addition unit 30 to perform the above-mentioned processing.

The dummy bit added A3D content data is transferred from the flow control unit 31 to the recording processing system as Step F205, and is eventually recorded in the minidisk 100 by the recording/reproducing unit 25 through the processing in the encoding/decoding unit 24. An operation of the flow control unit 31 will be described later.

In a case of the content data supplied over the transmission line being "E (CK, PCM)", that is, the compression system of the content data stored in the primary recording medium is different from the compression system required for the case of recording in the minidisk 100, or the bit rate is higher than the bit rate required for the case of recording in the minidisk 100 although both the compression systems are equal, the processing is advanced to Step F206 to firstly perform a decryption. That is, the decrypting unit 28 is allowed to perform the processing of "D {CK, E (CK, PCM)}"=PCM on the content data stream that is received by the receiver 26 and is then captured in the cache memory 29.

Then, the decrypted content data (PCM) is transferred to the flow control unit 31 without passing through the processing in the dummy bit addition unit 30, and is then transferred from the flow control unit 31 to the recording processing system as Step F207. In this case, in the recording processing system, the PCM data is transferred to the encoding/decoding unit 24 after being subjected to the ATRAC 3 compression processing by the codec 23, and is recorded in the minidisk 100 by the recording/reproducing unit 25. An operation of the flow control unit 31 in this case will be described later.

In a case of transferring the content data from the personal computer 1 to the recording/reproducing device 20A as described above, a signal processing is performed on the content data on the basis of the processing shown in FIGS. 5 and 6. The signal processing is summarized as shown in FIGS. 7A and 7B.

FIG. 7A shows the processing when a compression system of content data to be sent, which is stored in the primary recording medium, is equal to the compression system of the data to be recorded in the minidisk 100, and the bit rate is not more than the bit rate required for the case of recording in the minidisk 100.

In this case, the encrypted ATRAC 3 compressed content data "E (CK, A3D)" is sent to the transmission line as it is without being converted, and is then supplied toward the secondary recording medium side equipment (the recording/reproducing device 20A). Then, in the recording/reproducing device 20A, the encrypted ATRAC 3 compressed data is decrypted into the compressed data "A3D", which is then converted into the dummy bit added compressed data "A3D (md)" to meet a conformity to the minidisk system, providing data to be recorded in the minidisk 100.

The above-mentioned process has effects of simplifying the transfer processing, improving a transfer efficiency by the simplified transfer processing, reducing a transfer time and solving a problem on the deterioration of a sound quality, because of an elimination of the need for the processing such as decryption, decompression (conversion into PCM), recompression and re-encryption in the primary recording medium side equipment.

FIG. 7B shows a process of the processing in a case where the compression system of the content data stored in the primary recording medium is different from the compression system required at the time of recording in the minidisk 100, or a case where the bit rate is higher than the bit rate required at the time of recording in the minidisk 100, although both the compression systems are equal.

In this case, the encrypted compressed content data "E (CK, A3D)" or "E (CK, aDT)" is decrypted into A3D or aDT, which is further decoded (decompressed) for decompression into linear PCM data equivalent to non-compressed data. Then, the PCM data is again encrypted with the key CK into data "E (CK, PCM)", which is then sent to the transmission line and is eventually supplied to the secondary recording medium side equipment (recording/reproducing device 20A). Then, in the recording/reproducing device 20A, the encrypted data is decrypted into non-compressed data PCM, which is then subjected to the ATRAC 3 compression processing, providing data to be recorded in the minidisk 100.

In a case of the transfer of content data beyond an executable range of the process shown in FIG. 7A, the process shown in FIG. 7B enables to record the content data in the minidisk 100 with the recording/reproducing device 20A.

6. Flow Control of Data Recording Device

A flow control in the recording/reproducing device 20A will now be described.

When the content data received over the transmission line is recorded in the minidisk 100 serving as the secondary recording medium, there is a case where the content data stream fails to be processed successively for writing onto the minidisk 100 as data to be recorded, depending on a transmission bandwidth of the transmission line and a bandwidth of input to the secondary recording medium.

When the transmission interface is assumed to be a USB (Ver. 1.1), for instance, a bandwidth of 12 Mbps is ensured, while an effective bandwidth is limited to a small value for some reasons such as a capacity of the cache memory 29 and how much data is transferred from the receiver 26 to the cache memory 29, if taking a transfer of data in excess of an input buffer size of the receiver 26 into consideration. In particular, when received content data is non-compressed PCM data, a limitation on the bandwidth is increased, in comparison with a case of compressed data.

In addition, when a transfer from the cache memory 29 to the secondary recording medium (the minidisk 100) is conducted at low rate, successive writing often becomes inexecutable.

In this connection, the present embodiment brings a high rate transfer into realization by adopting a flow control as follows.

Specifically, while the content data that is received by the receiver 26 and is then transferred to the cache memory 29 is once stored in another region of the cache memory 29 after being decrypted by the decrypting unit 28, and is then transferred from the MD control unit 21 to the recording processing system (the encoding/decoding unit 24 and the codec 23) on the basis of control that is performed by the flow control unit 31, a flow control according to the conditions of each part is required between the flow control unit 31 and the MD control unit 21.

A description will now be given of the flow control when "E (CK, A3D)" is supplied over the transmission line, that is, the decrypted and dummy bit added ATRAC 3 compressed data is transferred from the flow control unit 31 to the MD control unit 21.

In this case, as shown in FIG. 4, a data transfer is performed in response to each of signals such as a data request XARQ from the MD control unit 21 to the flow control unit 31, as well as a byte sink XABS, a transfer clock ACLK and a compressed stream data DATA from the flow control unit 31 to the MD control unit 21.

Figure 12:
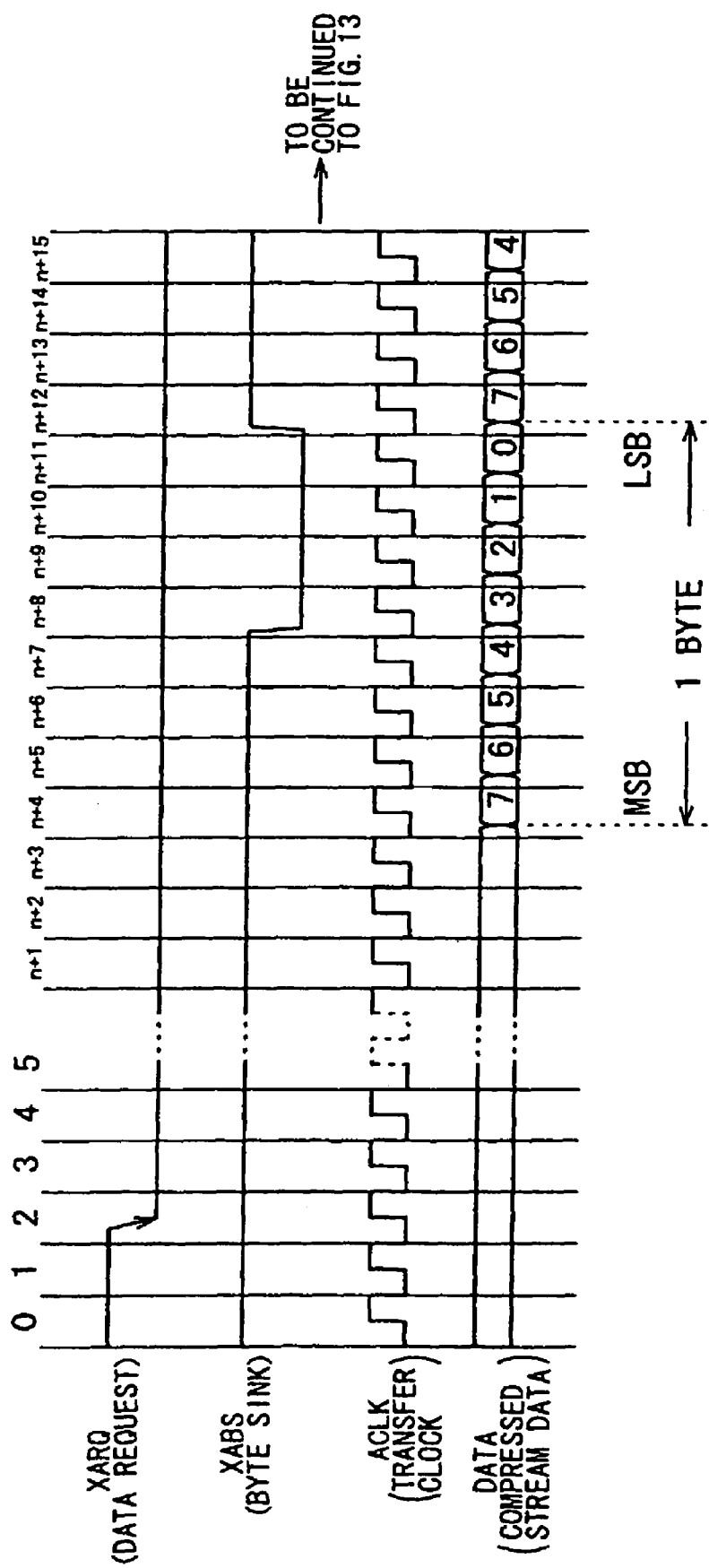
FIG. 12 illustrates a compressed data transfer operation of the secondary recording medium side equipment according to the embodiment.
Figure 13:
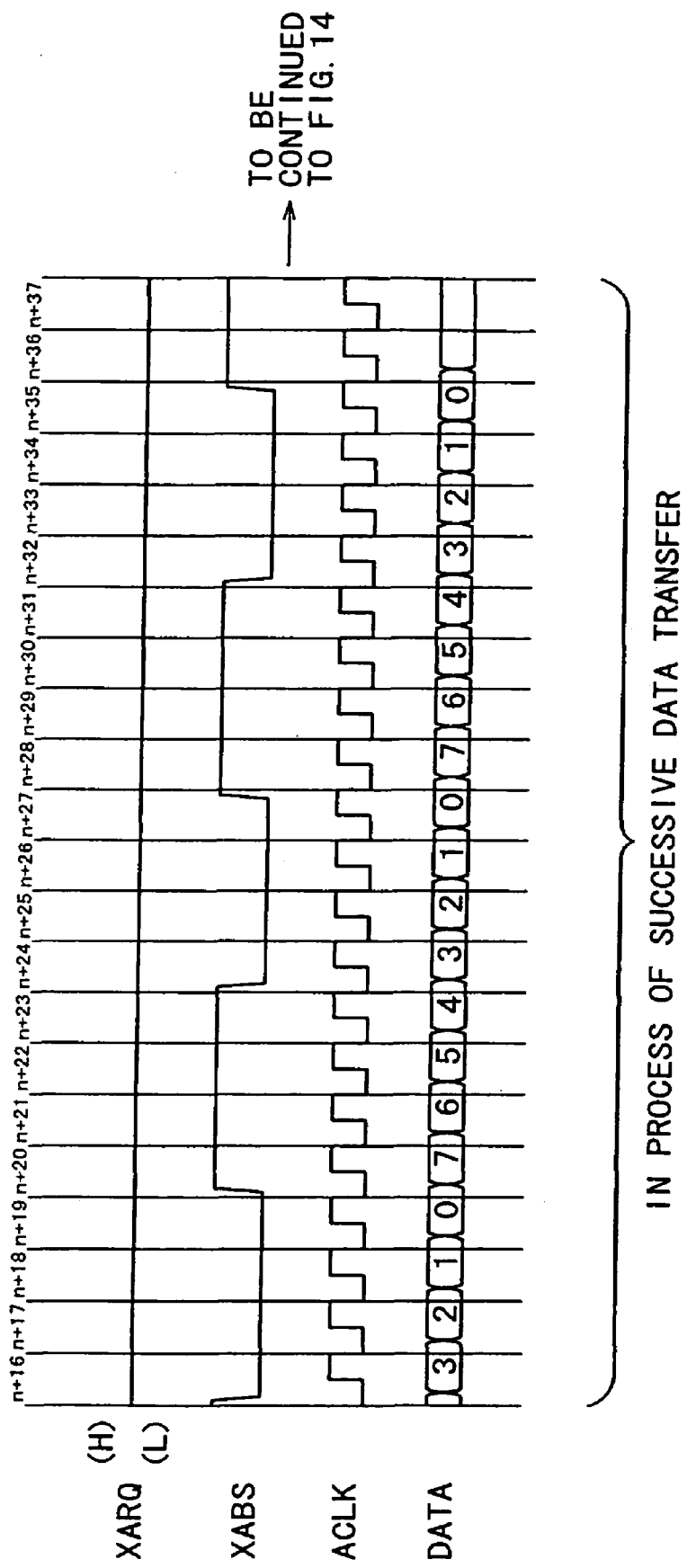
FIG. 13 illustrates a compressed data transfer operation of the secondary recording medium side equipment according to the embodiment.

FIGS. 12, 13 and 14 show a timing chart in a case of transfer. Incidentally, FIGS. 12, 13 and 14 provide a continuous timing chart, and a numerical value (a point of time) corresponding to a bit timing (the transfer clock ACLK) is shown at the upper most stage of each drawing.

In this case, the data transfer is performed in response to the data request XARQ from the MD control unit 21 to the flow control unit 31. When the data request XARQ is asserted, a reception of data from the transmission line such as the USB is performed, and the flow control unit 31 starts a transfer of the compressed stream data DATA to the MD control unit 21 in synchronization with the transfer clock ALCK, whenever 2 bytes are reserved in the cache memory 29 for decrypted data (the compressed stream data DATA) to be transferred to the recording processing system. At the same time, the flow control unit 31 outputs also the byte sink XABS in byte units.

Assuming that 2 bytes are reserved for the compressed stream data DATA up to a point of time "n+3" when the data request XARQ resides at a point of time "2" as shown in FIG. 12, for instance, a transfer of the compressed stream data DATA is started from a point of time "n+4", and the byte sink XABS is also outputted. As shown in the drawing, data of 1 byte is transferred from a MSB in synchronization with the transfer clock ALCK, and the byte sink XABS is also outputted according to a timing of low-order 4-bits.

After the start of the transfer as shown in FIG. 12, successive data transfer is performed as shown in FIG. 13, for instance.

Now it is assumed that the data transfer to the MD control unit 21 is temporarily interrupted according to circumstances of a receiving processing system from a point of time "n+36" as shown in FIG. 13. It is considered to be a case where the data transfer from the USB transmission line is too late, or a situation that the transfer from the receiver 26 to the cache memory 20 is too late occurs.

In this case, as shown in a point of time "n+38" in FIG. 14, the flow control unit 31 terminates the transfer by stopping output of the byte sink XABS. The MD control unit 21 in this case recognizes that the transfer is being interrupted by the fact that no byte sink XABS is acquired, in the pertinent transfer period of 1 byte.

Thereafter, if the transfer is resumed from a point of time "m+1", the byte sink XABS is outputted in a 1-byte period in this case, so that the MD control unit 21 captures the data in the 1-byte period in recognition of this data as the effective compressed stream data DATA.

On the other hand, when an interruption of the transfer is required according to circumstances of the recording processing system, such as a case of needing to interrupt the transfer temporarily from the flow control unit 31 for reasons of a transfer time of the processing of recording into the minidisk 100, for instance, the MD control unit 21 terminates the transfer by interrupting the data request XARQ.

In a period of time "m+15" shown in FIG. 14, for instance, if the data request XARQ is set to "H", a transfer request is turned off, and accordingly, the flow control unit 31 stops output of the compressed stream data DATA and the byte sink XABS in response to the off state of the transfer request. It is a matter of course that the data request XARQ is set to "L" again whenever an allowance will be made for the processing of the recording processing system, so that the transfer of the compressed stream data DATA is resumed.

As described above, the transfer between the flow control unit 31 and the MD control unit 21 may be made interrupted flexibly according to the circumstances of the receiving processing system or the recording processing system. That is, the flow control permits a regulation of the data transfer depending on each of the bandwidth of the transmission line and the reception processing or the processing of recording into the minidisk 100, so that an efficient data transfer is made executable.

A description will now be given of the flow control in a case where "E (CK, PCM)" is supplied over the transmission line, that is, the decrypted PCM data is transferred from the flow control unit 31 to the MD control unit 21.

In this case, as shown in FIG. 4, the data transfer is performed in response to each of signals such as an L/R clock LRCK, a data block XBCK and PCM stream data DATA from the flow control unit 31 to the MD control unit 21.

FIGS. 15A, 15B, 16A and 16B show a timing chart in a case of transfer. Incidentally, FIGS. 15A, 15B, 16A and 16B provide a successive timing chart, and a numerical value (a point of time) corresponding to the data clock XBCK is shown on the upper most stage of each drawing.

In this case, the decrypted PCM stream data DATA stored in the cache memory 29 is outputted from the flow control unit 31 to the MD control unit 21 in synchronization with the data clock XBCK correspondingly to the L/R clock LRCK.

The PCM stream data DATA is identified to be data on an L channel when the L/R clock LRCK is set to "H" level, and also to be data on an R channel when the L/R clock is set to "L" level. Each channel based on the L/R clock LRCK is supposed to hold for a 32-data block period, while 16-bit PCM data of each channel is transferred after an insertion into a 16-data clock period, which is the latter half of the 32-data clock period.

While a transfer of 16-bit data of the L channel is performed in a period from a point of time "0" shown in FIG. 15A to a point of time "31" shown in FIG. 15B, the 16-bit data is sent in synchronization with the data clock XBCK in a period from a point of time "16" to a point of time "31".

If an input of data to the MD control unit 21 is performed in synchronization with the L/R clock LRCK in sampling frequency units, a transfer of the content data to the MD control unit 21 occurs in real time. Thus, assuming that the L/R clock LRCK is set to be N times as much as a sampling frequency, a time of 1/N times as much as the real time will be enough to transfer the content data to the MD control unit 21 at high rate.

While FIGS. 15B and 16A show a period, during which the PCM stream data DATA is transferred successively, the flow control unit 31 terminates the transfer by stopping output of the data clock XBCK as shown in FIG. 16B in a case where the transfer of data to the MD control unit 21 is temporarily interrupted according to the circumstances of the receiving processing system, that is, the transfer of data from the USB transmission line is too late, for instance, or a situation that the transfer from the receiver 26 to the cache memory 29 is too late occurs. The MD control unit 21 in this case recognizes that the transfer is being interrupted by the fact that no data clock XBCK is acquired.

Thereafter, when the transfer is made executable, the flow control unit 31 resumes the output of the data clock XBCK and also resumes the transfer of the PCM stream data DATA in synchronization with the data clock XBCK on the basis of the L/R clock LRCK. The MD control unit 21 captures the PCM stream data DATA in response to the data clock XBCK and the L/R clock LRCK.

Whenever the PCM stream data DATA having been inputted to the MD control unit 21 reaches a data size of an individual sound block, the compression processing by the codec 23 is started. In a case of the ATRAC, for instance, the compression processing is started whenever 512-word*16-bit data per channel is stored in an input buffer memory arranged for the compression processing.

A permissible time taken for the compression processing is supposed to be "sampling clock period"*"sound block size"*½*1/N. N denotes a value in a case where the L/R clock LRCK is set to be N times as much as the sampling frequency as described above. In addition, ½ is used because of a need for the compression of two channel data in a time-division manner.

Thus, an increase in speed of the L/R clock LRCK within the allowable range of the conditions causes no termination of the transfer by compression rate limitations.

That is, in this case, there is theoretically no need to interrupt the transfer due to the circumstances of the recording processing system.

Then, even in a case of the transfer of the PCM stream data DATA, the transfer thereof may be made flexibly interrupted according to the circumstances of the transmission line and the reception processing system. In addition, a high rate transfer is also made possible depending on setting of the L/R clock LRCK. Accordingly, an efficient data transfer is made executable.

Having described the illustrations as the embodiments, it is to be understood that the present invention is not limited to the above embodiments.

For instance, target data for the transfer from the primary recording medium to the secondary recording medium is not limited to the SDMI contents as described above, and various kinds of content data may be also widely employed.

The primary recording medium is also supposed to be available in various types, in addition to the HDD.

It is a matter of course that the secondary recording medium and the secondary recording medium side equipment 20A are also supposed to be available in various types, without being limited to the minidisk and the minidisk recording device. The secondary recording medium 100 may be the CD-R; the CD-RW; the DVD-RAM; the DVD-R; the DVD-RW; various kinds of memory cards and the like. Thus, the secondary recording medium side equipment 20A may be a recording device that is compatible with these media.

Having mentioned the present invention also as related to the SDMI-compliant recording/reproducing device 20B, it is to be understood that the present invention may be also applied to a transfer of the content data to the recording/reproducing device 20B.

According to the present invention as has been understood from the above description, in a case of transferring the content data from the data transfer device on the primary recording medium side to the data recording device to record the content data in the secondary recording medium, the data compression system and the bit rate that are conformable to the data recording device are compared with the data compression system and the bit rate of the content data to be sent, so that a required transfer processing is brought into realization according to a result of the comparison. Specifically, when the data compression system of the content data to be sent is equal to the data compression system that is conformable to the data recording device, and the bit rate of the content data to be sent is not more than the bit rate that is conformable to the data recording device, the content data is sent as it is in the encrypted compressed data state, and the compressed data is recorded in the secondary recording medium after the required data addition processing is performed on the compressed data upon completion of the conversion into the non-encrypted state in the data recording device. In this case, a conversion of the compressed data format inclusive of a conversion into the PCM data, for instance, is not required, and data is sent in the compressed data format over the transmission line, so that a higher efficiency of the content data transfer processing as well as a reduction of the time taken for the transfer may be realized. In addition, a problem such as the deterioration of a sound quality does not occur, because of no need of the processing steps such as decompression and recompression.

On the other hand, in a case where the data compression system of the content data to be sent is different from the data compression system that is conformable to the data recording device, or where the bit rate of the content data to be sent is higher than the bit rate that is conformable to the data recording device, the content data is sent as the state of encrypted non-compressed data, and the non-compressed data is recorded in the secondary recording medium after the compression processing is performed on the non-compressed data upon completion of the conversion into the non-encrypted state in the data recording device, so that transfer and/or recording to the secondary recording medium may be realized also as to the content data in the compression system that is unconformable to the secondary recording medium side.

In a case of transferring the stream data as the received and decrypted compressed data or non-compressed data toward the secondary recording medium drive means for the processing of recording the stream data in the secondary recording medium, the data recording device controls the transfer state depending on the reception processing state in the reception means and the signal processing state of the secondary recording medium drive means, so that the optimum data transfer and recording processing is realized in accordance with the transmission line, signal processing capabilities and the like.

The invention claimed is:

1. A data recording device, comprising:
reception means for receiving content data sent from a data transfer device;
secondary recording medium drive means for recording the content data in a secondary recording medium;
determining means for determining if a compression system of the content data and a compression system of the secondary recording medium are equal, and for determining if the bit rate of the content data is less than or equal to the bit rate of the secondary recording medium;
adding means for, when it is determined that the compression system of the content data and the compression system of the secondary recording medium are equal and that the bit rate of the content data is less than or equal to the bit rate of the secondary recording medium, increasing the data per content unit by adding dummy bits to the content data;
compression means for compressing the content data when it is determined that the compression system of the content data and the compression system of the secondary recording medium are not equal, and for compressing the content data when it is determined that the bit rate of the content data is greater than the bit rate of the secondary recording medium;
decrypting means for converting content data from an encrypted state into a non-encrypted state; and
recording control means for recording the content data in the secondary recording medium.

2. The data recording device according to claim 1, wherein the recording control means controls a transfer state according to a reception processing state in the reception means and a signal processing state of the secondary recording medium drive means.

3. A data recording device, comprising:
reception unit configured to receive content data sent from a data transfer device;
secondary recording medium drive for recording the content data in a secondary recording medium;
determining unit configured to determine if a compression system of the content data and a compression system of the secondary recording medium are equal, and for determining if the bit rate of the content data is less than or equal to the bit rate of the secondary recording medium;
adding unit configured to, when it is determined that the compression system of the content data and the compression system of the secondary recording medium are equal and that the bit rate of the content data is less than or equal to the bit rate of the secondary recording medium, increase the data per content unit by adding dummy bits to the content data;
compression unit configured to compress the content data when it is determined that the compression system of the content data and the compression system of the secondary recording medium are not equal, and for compressing the content data when it is determined that the bit rate of the content data is greater than the bit rate of the secondary recording medium;
decrypting unit to convert content data from an encrypted state into a non-encrypted state; and
recording control unit to record the content data in the secondary recording medium.

* * * * *